United States Patent
Ueda

(10) Patent No.: US 11,481,166 B2
(45) Date of Patent: Oct. 25, 2022

(54) INFORMATION PROCESSING SYSTEM, INFORMATION PROCESSING APPARATUS FOR CONTROLLING ACCESS TO RESOURCES AND FUNCTIONS FOR MANAGING USERS ALLOWED TO ACCESS THE RESOURCES

(71) Applicant: FUJIFILM Business Innovation Corp., Tokyo (JP)

(72) Inventor: Hiroyuki Ueda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 238 days.

(21) Appl. No.: 16/574,002

(22) Filed: Sep. 17, 2019

(65) Prior Publication Data
US 2020/0097233 A1 Mar. 26, 2020

(30) Foreign Application Priority Data

Sep. 25, 2018 (JP) .............................. JP2018-179075

(51) Int. Cl.
  *G06F 3/12* (2006.01)
  *H04L 9/40* (2022.01)
  *H04L 65/00* (2022.01)
  *H04L 67/1001* (2022.01)

(52) U.S. Cl.
  CPC .......... *G06F 3/1238* (2013.01); *G06F 3/1222* (2013.01); *H04L 63/10* (2013.01); *H04L 63/101* (2013.01); *H04L 63/102* (2013.01); *H04L 63/105* (2013.01); *G06F 3/1224* (2013.01); *G06F 3/1239* (2013.01); *H04L 65/00* (2013.01); *H04L 67/1001* (2022.05)

(58) Field of Classification Search
None
See application file for complete search history.

(56) References Cited

U.S. PATENT DOCUMENTS

| 10,606,652 B2* | 3/2020 | Ben Zeev | H04L 47/805 |
| 2013/0254362 A1* | 9/2013 | Iwase | G06F 3/1238 |
| | | | 709/223 |
| 2014/0373099 A1* | 12/2014 | Durbha | H04L 63/10 |
| | | | 726/4 |

(Continued)

FOREIGN PATENT DOCUMENTS

JP 2017102813 6/2017

OTHER PUBLICATIONS

"Office Action of Japan Counterpart Application", dated May 31, 2022, with English translation thereof, p. 1-p. 5.

*Primary Examiner* — Haris Sabah
(74) *Attorney, Agent, or Firm* — JCIPRNET

(57) ABSTRACT

An information processing system includes a first controller that controls access to resources on a network based on authority to use the resources, a first manager that registers and manages users who access the resources via the first controller, a second controller that controls, independently of the first controller, access to the resources on the network based on authority to use the resources, a second manager that registers and manages users who access the resources via the second controller, and an identifier that identifies, in response to second authority to use a resource in the second manager being set for a user, first authority of the user to use the resource in the first manager.

11 Claims, 22 Drawing Sheets

(56) References Cited

U.S. PATENT DOCUMENTS

| | | | | |
|---|---|---|---|---|
| 2015/0153975 A1* | 6/2015 | Mori | ................... | G06F 3/1222 |
| | | | | 358/1.14 |
| 2018/0330066 A1* | 11/2018 | Hase | ................... | G06F 21/305 |

\* cited by examiner

| USER ID | USER NAME | MAIL ADDRESS |
|---|---|---|
| USER-0001 | USER I | user.george@example.com |
| USER-0002 | USER II | user.jack@example.com |
| USER-0003 | USER III | user.henry@example.com |
| USER-0004 | USER IV | user.nancy@example.com |
| ... | ... | ... |

| ROLE ID | ROLE NAME | FUNCTION CODE | FUNCTION ELEMENT CODE | | | | |
|---|---|---|---|---|---|---|---|
| LICENSE-0001 | PRINTING_ ALL FUNCTIONS | PRINT_SVC | PRINT_FN1, PRINT_FN2 | ... | ... | ... | ... |
| LICENSE-0002 | PRINTING_ LIMITED FUNCTIONS | PRINT_SVC | PRINT_FN1 | | | | |
| LICENSE-0003 | TRANSLATION_ ALL LANGUAGES | TRANS_SVC | SCAN_ENG, SCAN_KR, SCAN_ZH_CN, SCAN_ZH_TW | | | | |
| LICENSE-0004 | TRANSLATION_ ENGLISH | TRANS_SVC | SCAN_ENG | | | | |
| ... | ... | ... | ... | | | | |

| TENANT ID | TENANT NAME | FUNCTION CODE |
|---|---|---|
| TENANT-0001 | TENANT A | PRINT_SVC, TRANS_SVC | ... |
| TENANT-0002 | TENANT B | PRINT_SVC | ... |
| ... | ... | ... | ... |

| TENANT ID | USER ID | ROLE ID | TENANT ADMINISTRATOR FLAG |
|---|---|---|---|
| TENANT-0001 | USER-0001 | LICENSE-0001, LICENSE-0003 | TRUE | ... |
| TENANT-0001 | USER-0002 | LICENSE-0002, LICENSE-0004 | FALSE | ... |
| TENANT-0002 | USER-0003 | LICENSE-0001 | TRUE | ... |
| TENANT-0002 | USER-0004 | LICENSE-0002 | FALSE | ... |
| ... | ... | ... | ... | ... |

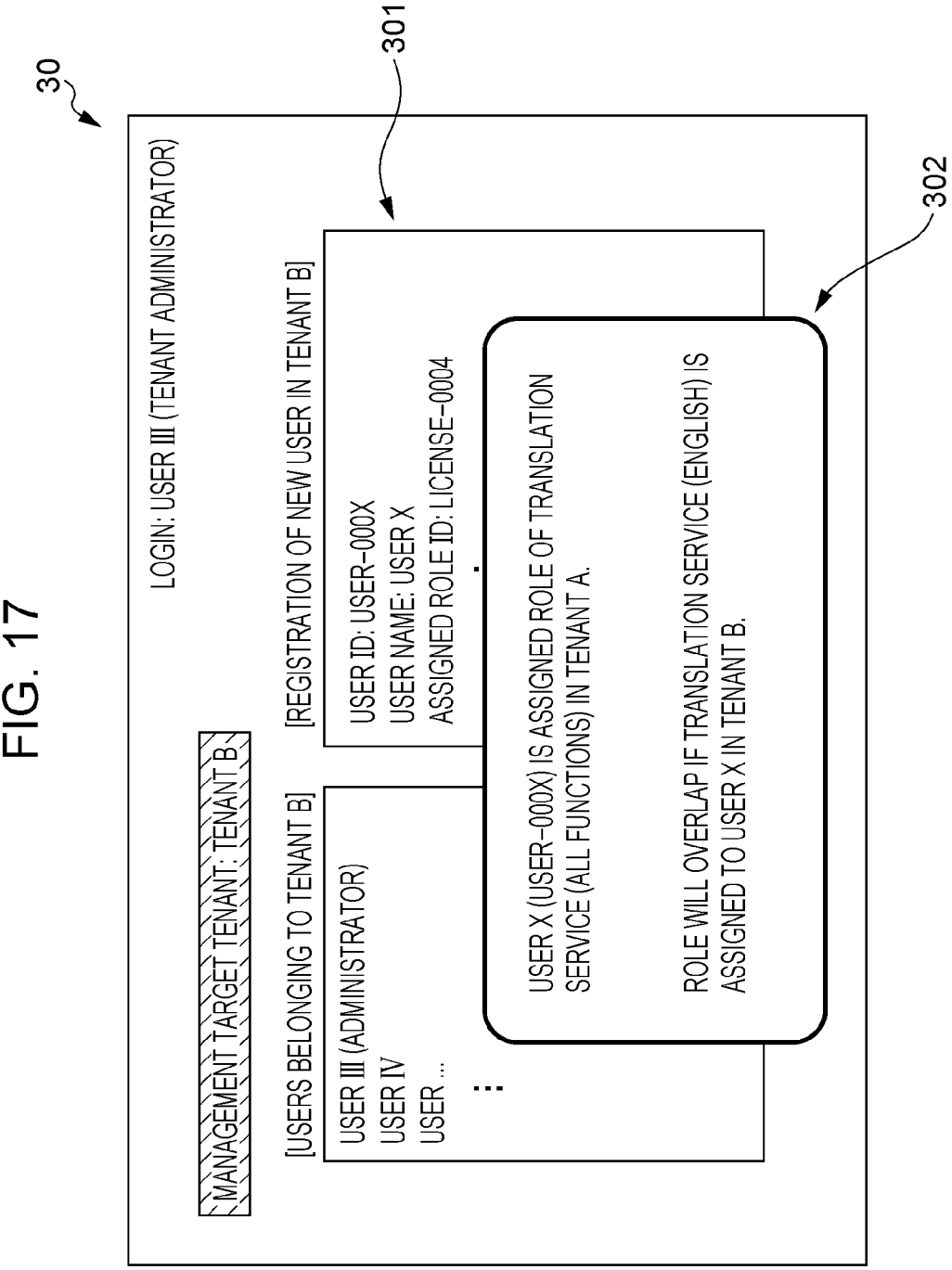

INFORMATION PROCESSING SYSTEM, INFORMATION PROCESSING APPARATUS FOR CONTROLLING ACCESS TO RESOURCES AND FUNCTIONS FOR MANAGING USERS ALLOWED TO ACCESS THE RESOURCES

CROSS-REFERENCE TO RELATED APPLICATIONS

This application is based on and claims priority under 35 USC 119 from Japanese Patent Application No. 2018-179075 filed Sep. 25, 2018.

BACKGROUND

(i) Technical Field

The present disclosure relates to an information processing system, an information processing apparatus, and a non-transitory computer readable medium.

(ii) Related Art

For example, Japanese Unexamined Patent Application Publication No. 2017-102813 describes an information processing system that includes one or more information processing apparatuses and provides service functions to electronic apparatuses. The information processing system includes an identification information manager that manages service functions to be provided after license authentication for services in association with identification information to be used for the license authentication, an organization information manager that manages the service functions subjected to the license authentication for each organization, and a service manager that manages the service functions to be provided for the organization based on the service functions that have been subjected to the license authentication and are managed by the organization information manager for each organization.

SUMMARY

Aspects of non-limiting embodiments of the present disclosure relate to the following circumstances. In a related-art system having a control function for controlling access to resources on a network based on authority to use the resources and a management function for managing users allowed to access the resources by using the control function, a user may redundantly have authority to use the same resource.

Aspects of non-limiting embodiments of the present disclosure also relate to prevention of redundant provision of authority to use the same resource for a user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system comprising a first controller that controls access to resources on a network based on authority to use the resources, a first manager that registers and manages users who access the resources via the first controller, a second controller that controls, independently of the first controller, access to the resources on the network based on authority to use the resources, a second manager that registers and manages users who access the resources via the second controller, and an identifier that identifies, in response to second authority to use a resource in the second manager being set for a user, first authority of the user to use the resource in the first manager.

BRIEF DESCRIPTION OF THE DRAWINGS

An exemplary embodiment of the present disclosure will be described in detail based on the following figures, wherein:

FIG. 3 illustrates an example of the hardware configuration of a computer that implements a tenant management server, a resource providing server, a client terminal, and the like;

FIGS. 5A and 5B illustrate examples of a user information management table and a role management table;

FIG. 17 illustrates an example of an administrator's operation screen to be displayed on a display part of the client terminal of the exemplary embodiment.

DETAILED DESCRIPTION

An exemplary embodiment is described below in detail with reference to the accompanying drawings.

<Overall Configuration of Information Processing System 1>

Figure 1:
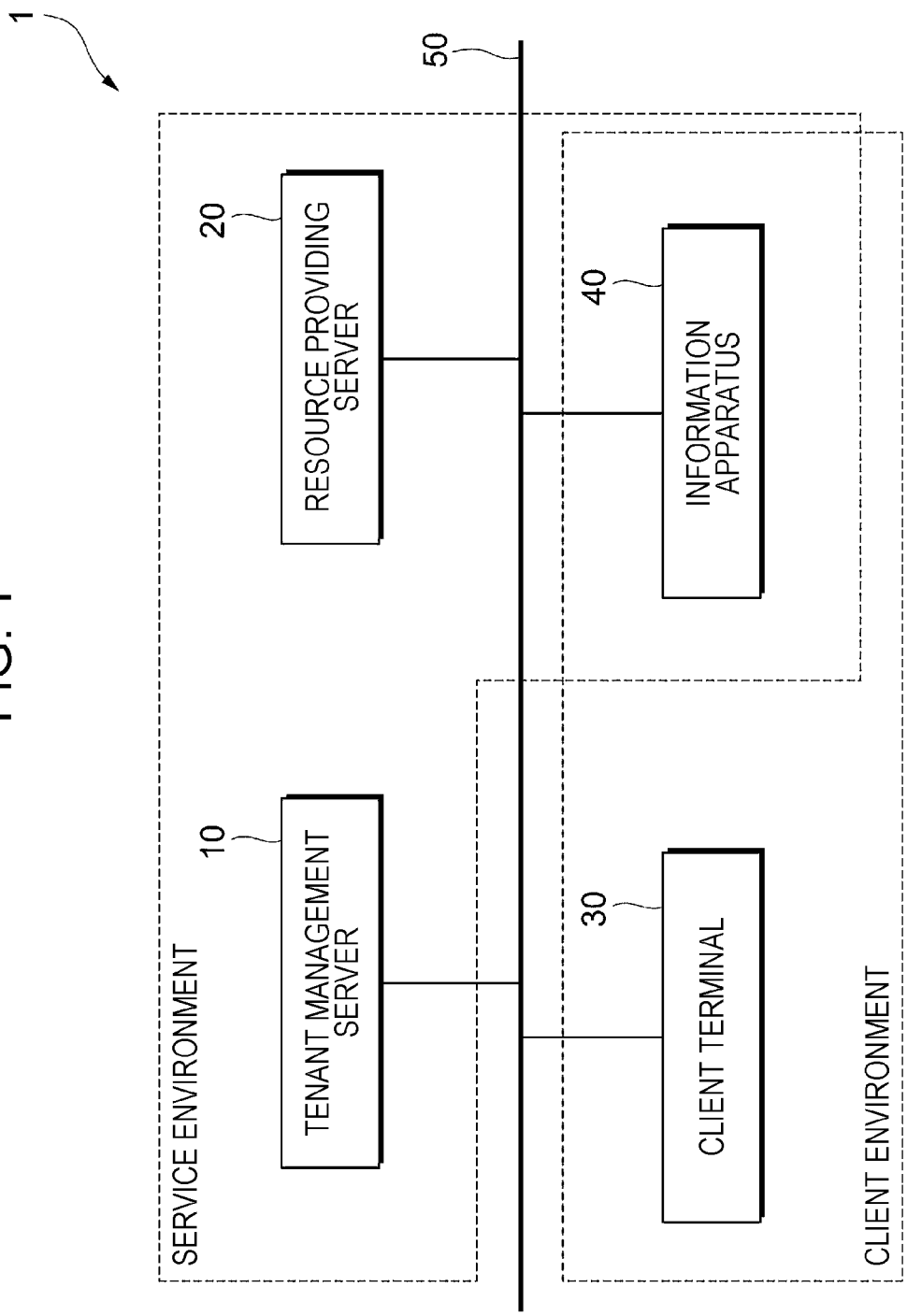
FIG. 1 illustrates the overall configuration of an information processing system of an exemplary embodiment.

FIG. 1 illustrates the overall configuration of an information processing system 1 of this exemplary embodiment.

As illustrated in FIG. 1, the information processing system 1 of this exemplary embodiment includes a tenant management server 10, a resource providing server 20, a client terminal 30, and an information apparatus 40. The apparatuses are connected together via a network 50.

As indicated by broken lines in FIG. 1, the tenant management server 10 and the resource providing server 20 configurate a service environment in which resources on the network 50 are provided and the client terminal 30 configurates a client environment in which the resources on the network 50 are used.

Assuming that the function of the information apparatus 40 is a resource available on the network 50, the information apparatus 40 is included in the service environment from the viewpoint of using the function of the information apparatus 40 at the client terminal 30. Similarly to the client terminal 30, the information apparatus 40 may be an operation target apparatus that is directly operated by a user via a user interface of the information apparatus 40. From this viewpoint, the information apparatus 40 is included in the client environment.

As described later, for example, the resource providing server 20 provides a service function and the information apparatus 40 provides a function. In the description of this exemplary embodiment, the service function provided by the resource providing server 20 and the function provided by the information apparatus 40 may be referred to collectively as "functions" unless otherwise distinguished.

The tenant management server 10 manages users' authority to use the resources on the network 50 and is an example of a manager. Further, the tenant management server 10 controls users' access to the resources on the network 50 based on the authority to use the resources and is an example of a controller.

For example, the resource on the network 50 refers to hardware, software, or data available for the users via the network. If a service function to be provided via the network (web service or cloud service) is used, hardware or software that provides the service function is used. In this exemplary embodiment, the resource on the network 50 includes the service function to be provided via the network. If the information apparatus 40 is operated via the network 50, the function of the information apparatus 40 is included in the resource available at the client terminal 30 via the network 50.

The resource providing server 20 provides a specific resource via the network. The resource providing server 20 includes a so-called service provider. The service provider refers to a server that provides a service via the network (web service or cloud service). For example, the service function to be provided by the resource providing server 20 as a resource is implemented by an application program to be used via the network 50 (web application) or processing to be performed by using an application program provided at the back end. The service function to be provided by the resource providing server 20 includes provision of hardware resources such as a storage and a processor and provision of software (software package).

For example, the resource providing server 20 of this exemplary embodiment provides a translation service, which is a service function for translating English into a different language. The translation service to be provided as the service function includes a plurality of function elements. The translation service of this exemplary embodiment includes a plurality of function elements such as a function element for translating English into Japanese, a function element for translating English into German, and a function element for translating English into French. All the translation languages, that is, all the function elements prepared in the translation service are referred to as "all functions". In the translation service, function elements for a subset of languages are referred to as "limited functions".

The client terminal 30 is a terminal apparatus that uses the service provided by the resource providing server 20 via the tenant management server 10. Examples of the client terminal 30 include a personal computer, portable information terminals such as a tablet terminal and a smartphone, and other information terminals to be connected to the tenant management server 10 via the network 50 to use the resources on the network 50. As described above, the use of the resources on the network 50 includes not only the use of the service, the hardware resource, or the software package provided by the resource providing server 20 but also the use of the function of the information apparatus 40 via the network 50.

The information apparatus 40 is an information processing apparatus that is used by a user and is connectable to the network 50. The information apparatus 40 differs from the client terminal 30 and is managed by the tenant management server 10. The information apparatus 40 has a user interface and may be an operation target apparatus that is directly operated by the user similarly to the client terminal 30.

For example, the information apparatus 40 is implemented by office equipment having a communication function for establishing connection to the network 50. Specifically, the information apparatus 40 is a copying machine that performs copying, a scanner that scans images, a facsimile transmitter/receiver that performs facsimile transmission and reception, a printer that prints images on paper media, or a multifunction peripheral having those functions integrally. The information apparatus 40 may be an information terminal such as a personal computer or a tablet terminal that is shared in an office (not allocated to each user). The function of the information apparatus 40 may be used at the client terminal 30 as a resource on the network 50 that is managed and provided by the tenant management server 10. The information apparatus 40 may be connected to the client terminal 30 via a LAN different from the network 50.

As described above, the information apparatus 40 of this exemplary embodiment includes a plurality of function elements such as a copying function element, a scanning function element, a facsimile function element, and a printing function element. All the function elements of the function to be provided by the information apparatus 40 are referred to as "all functions". A subset of function elements out of the plurality of function elements to be provided by the information apparatus 40 is referred to as "limited functions".

The network 50 is a communication network for use in data communication among the apparatuses that configurate the information processing system 1. The type of the network 50 is not particularly limited as long as data is transmissible and receivable. Examples of the network 50 include the Internet, a local area network (LAN), and a wide area network (WAN). A communication line for use in data communication may be wired or wireless. The apparatuses may be connected together via a plurality of networks or communication lines. As described above, the client terminal 30 and the information apparatus 40 that configurate a user environment in the information processing system 1 may be connected together via a LAN different from the network 50. In this case, for example, a network connecting the client environment to the service environment may be constructed by connecting, to the network 50, the LAN (router of the LAN) connecting the client terminal 30 and the information apparatus 40 together.

<Management Function of Information Processing System>

Figure 2:
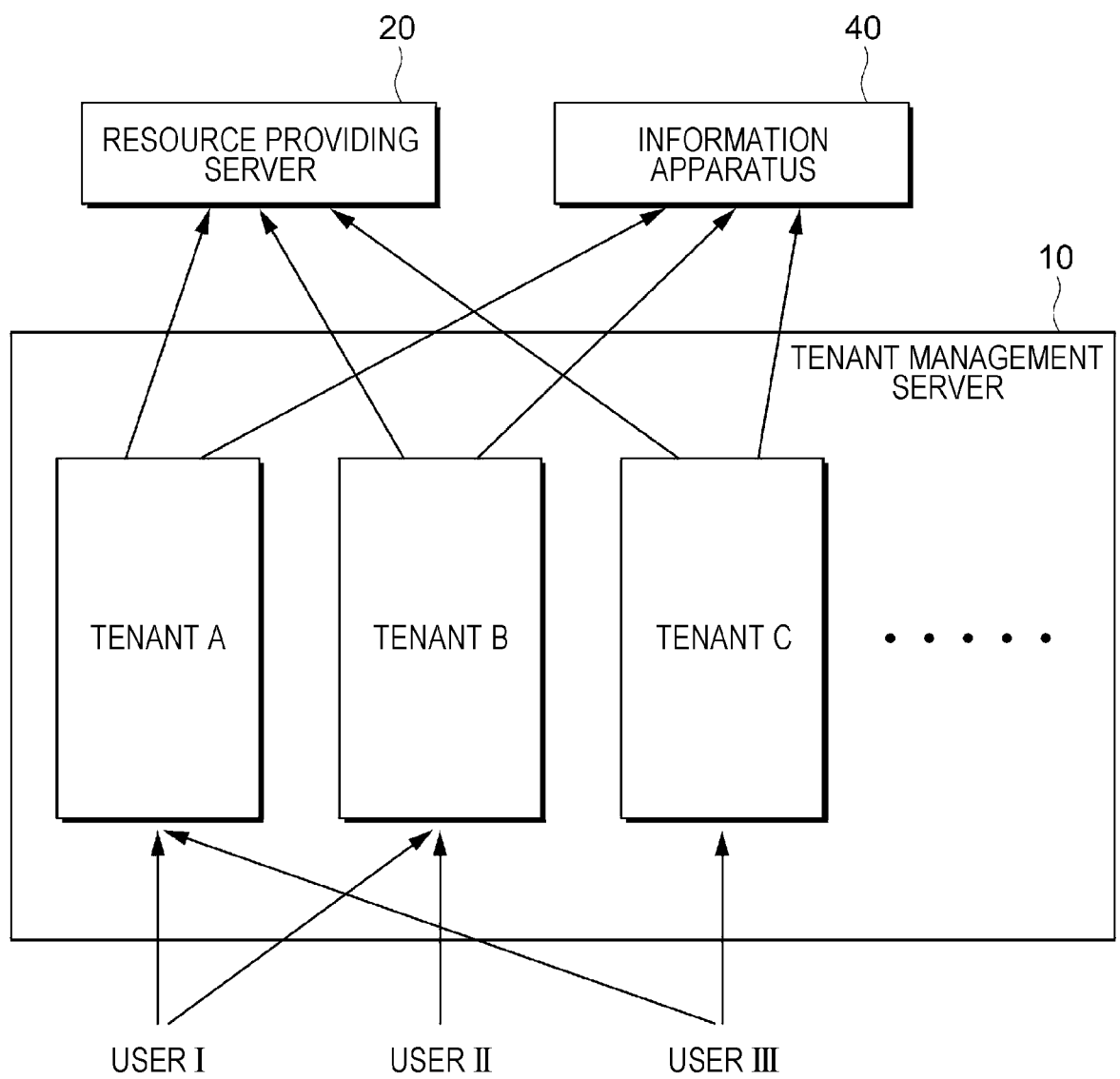
FIG. 2 illustrates a multi-tenant management method in the information processing system of the exemplary embodiment.

FIG. 2 illustrates a multi-tenant management method in the information processing system 1 of this exemplary embodiment.

In this exemplary embodiment, the tenant management server 10 manages authority to use the resources on the network 50 by the multi-tenant management method. The tenant refers to an element to be managed in relation to the use of the resources on the network 50. In the multi-tenant management method, a plurality of tenants are set and the authority is managed for each tenant. Thus, the tenant management server 10 is an example of a tenant manager.

For example, a license for using the service provided by the resource providing server 20 (web service or cloud service), a license for using the software package available via the resource providing server 20, or a license for using the function of the information apparatus 40 is set in each tenant. The license refers to authority provided in the tenant to use the service or the software package. The license is provided in the tenant by a provider of the cloud service or a vendor of the software package. Terms defined in the license provide for a maximum number of users and the like.

One or a plurality of users belong to each tenant. In practical use, the tenant may be set in association with various types of organization such as a company, a department in a company, and other groups depending on a contract for use or the like. With this setting, various licenses described above may be managed and the use of the resources on the network 50 may be controlled for each organization associated with the tenant. That is, the user belonging to the tenant (hereinafter referred to as a member user) and the license set in the tenant are managed in the tenant. The organization for which tenants are set may use the resources on the network 50 in the respective tenants in a similar way to a case of using dedicated resources provided in separate systems.

A tenant administrator is set in each tenant. The tenant administrator assigns a role to a user belonging to the tenant. The role refers to authority to use a license assigned to (provided for) the user.

The tenant administrator refers to a person who permits a user to belong to the tenant, sets a role for the user belonging to the tenant, and manages the member user and the role assigned to the member user. The tenant administrator is also a person who sets a license in the tenant. The user belonging to the tenant refers to a user registered in association with the tenant and permitted to use the license set in the tenant in accordance with the assigned role. The role of the user is defined within a range of the license set in the tenant.

For example, if the number of licenses set in the tenant is 10 regarding use of a certain software package, up to ten member users may be assigned roles for using the software package. In other words, even if more than ten users belong to the tenant, roles may not be assigned to member users in excess of 10.

As described above, the functions of the information apparatus 40 and the resource providing server 20 include the plurality of function elements in this exemplary embodiment. In this exemplary embodiment, the roles may be assigned to the member users for the respective function elements.

In this exemplary embodiment, for example, if the role is assigned to one member user for one function element with one license, a count is recorded under the assumption that the one license is assigned to the user.

In this exemplary embodiment, if the user belongs to a plurality of tenants and if the role is assigned in any one of the tenants, the user may access the resource based on the role.

<Hardware Configuration of Each Apparatus>

Figure 3:
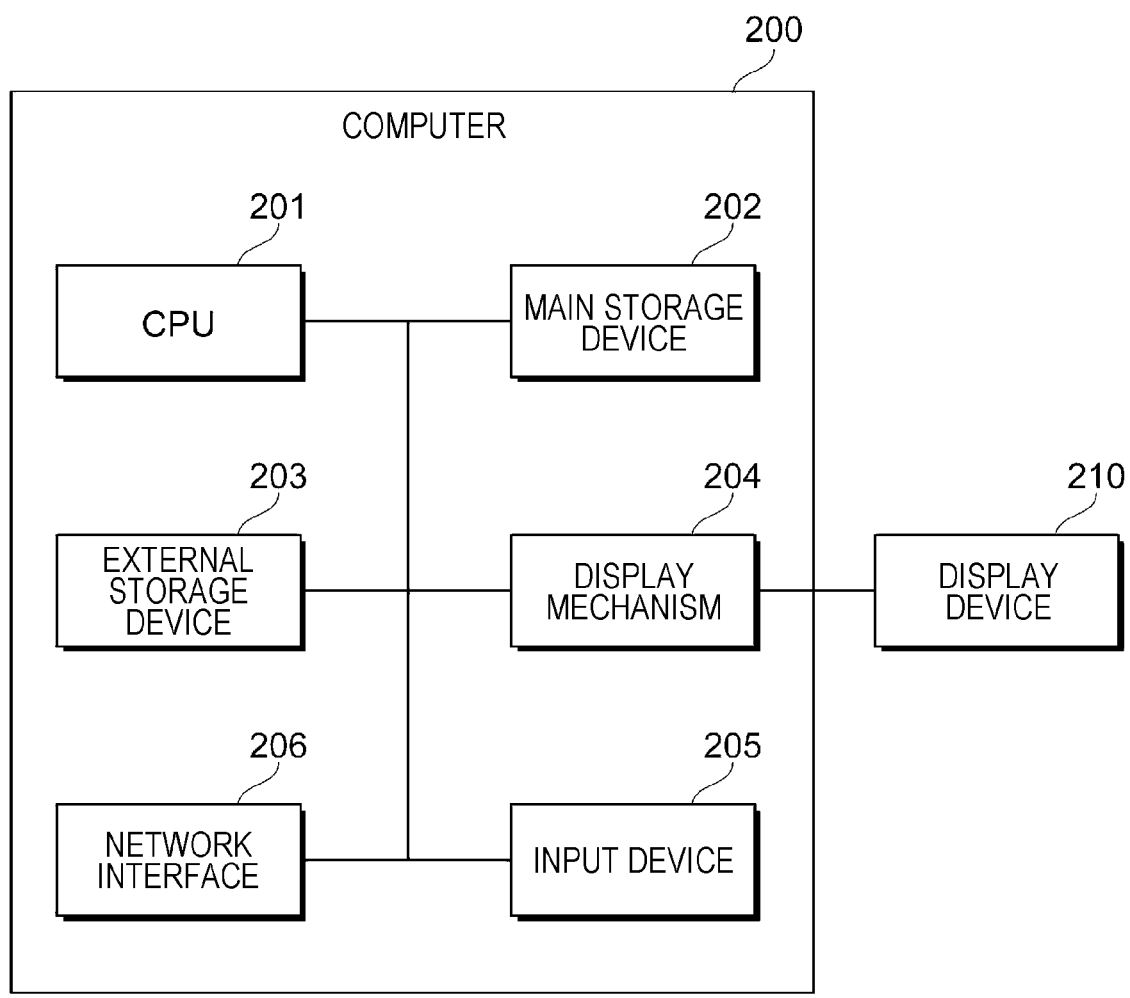

FIG. 3 illustrates an example of the hardware configuration of a computer that implements the tenant management server 10, the resource providing server 20, the client terminal 30, and the like.

A computer 200 illustrated in FIG. 3 includes a central processing unit (CPU) 201 serving as a calculator, and a main storage device (main memory) 202 and an external storage device 203 each serving as a memory. The CPU 201 executes a program stored in the external storage device 203 by reading the program in the main storage device 202. Examples of the main storage device 202 to be used include a random access memory (RAM). Examples of the external storage device 203 to be used include a magnetic disk drive and a solid state drive (SSD). The computer 200 further includes a display mechanism 204 for display output to a display device (display) 210, and an input device 205 to be used by an operator of the computer 200 to perform an input operation. Examples of the input device 205 to be used include a keyboard and a mouse. The computer 200 further includes a network interface 206 for connection to the network 50.

For example, the program that causes the tenant management server 10, the resource providing server 20, and the client terminal 30 to implement a series of operations of the information processing system 1 of this exemplary embodiment may be provided by using a communicator or by being stored in various recording media.

The configuration of the computer 200 illustrated in FIG. 3 is merely an example and the configuration of the computer 200 is not limited to the example of the configuration of FIG. 3. For example, the computer 200 may include, as the storage device, a non-volatile memory such as a flash memory or a read only memory (ROM). The specific configuration may differ depending on the application of the tenant management server 10, the resource providing server 20, the client terminal 30, or the like. For example, if the client terminal 30 is implemented by a tablet terminal, a touch panel that is a combination of a touch sensor and a liquid crystal display is used as the input device 205. Each of the tenant management server 10 and the resource providing server 20 may be configured by using the computer 200 alone as illustrated in FIG. 3 or may be implemented through distributed processing by using a plurality of computers 200.

<Functional Configuration of Tenant Management Server>

Figure 4:
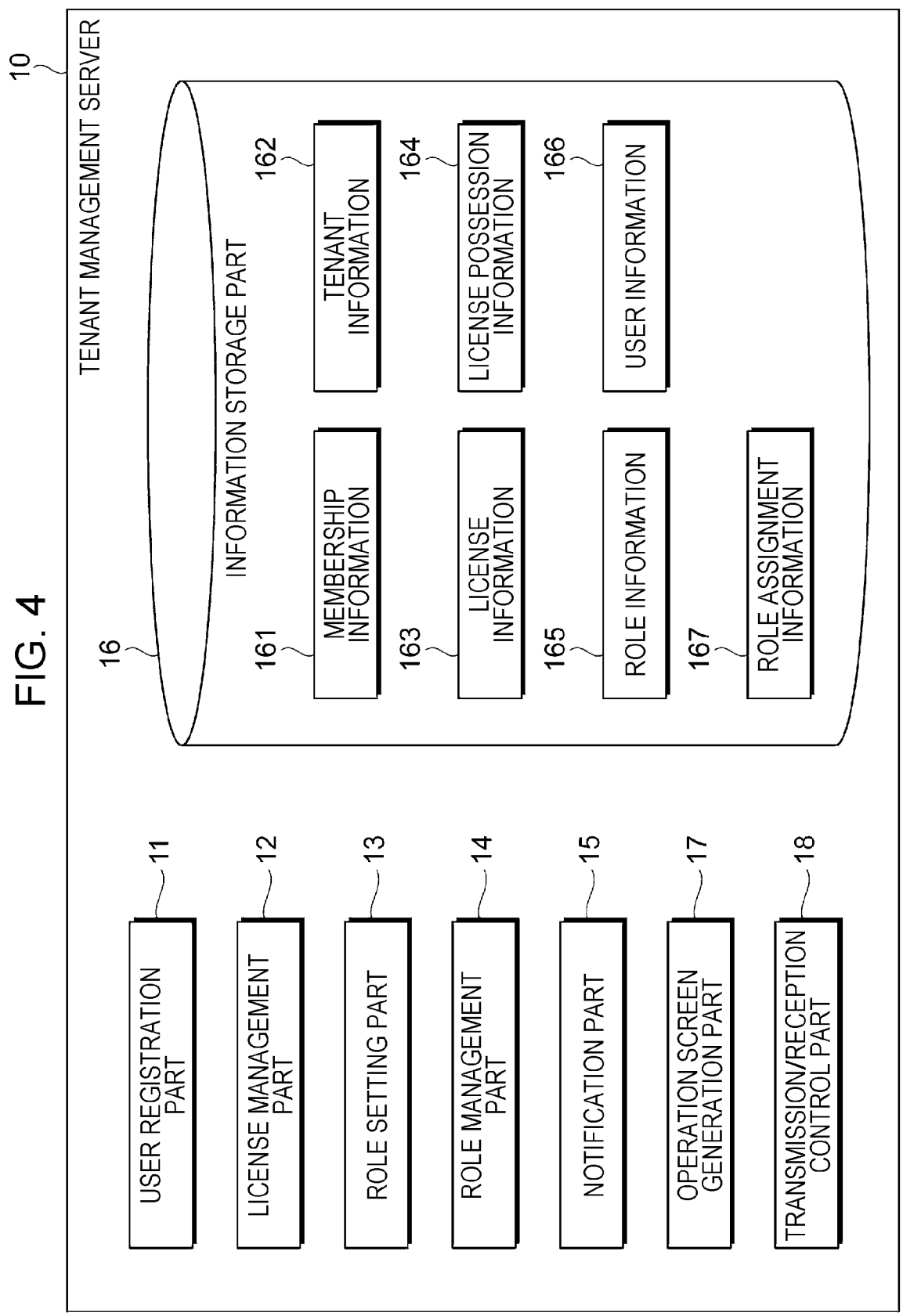
FIG. 4 illustrates the functional configuration of the tenant management server.

FIG. 4 illustrates the functional configuration of the tenant management server 10.

As illustrated in FIG. 4, the tenant management server 10 includes a user registration part 11 that registers member users of tenants, and a license management part 12 that manages licenses set in the tenants in association with the tenants. The tenant management server 10 further includes a role setting part 13 that sets, for the users belonging to the tenants, roles for using the licenses set in the tenants, and a role management part 14 that manages information related to the roles. The tenant management server 10 further includes a notification part 15 that gives notifications related to role setting, an information storage part 16 that stores information for use in tenant management, and an operation screen generation part 17 that generates operation screens for receiving operations of the users belonging to the tenants. The tenant management server 10 further includes a transmission/reception control part 18 for communication with the resource providing server 20, the client terminal 30, and the information apparatus 40.

The information storage part 16 stores pieces of information on the member users, the tenants, the licenses, the roles, and the like while those pieces of information are variously associated with each other. Details of those pieces of information are described later.

For example, the functions of the user registration part 11, the license management part 12, the role setting part 13, the role management part 14, the notification part 15, the operation screen generation part 17, and the transmission/reception control part 18 are implemented such that the CPU 201 executes the program in the computer 200 illustrated in FIG. 3. For example, the information storage part 16 is implemented by the main storage device 202 and the external storage device 203 in the computer 200 illustrated in FIG. 3.

(User Registration Part 11)

The user registration part 11 registers a member user in each tenant. For example, the user registration part 11 may register a member user under a condition that the user has been authenticated by an authentication server (not illustrated) connected to the network 50. A general identity provider (IdP) may be used as the authentication server. The IdP refers to a personal authentication server for users. The information storage part 16 stores information on the registered member user as user information 166 and also stores, as membership information 161, information that associates the user and the tenant to which the user belongs.

(License Management Part 12)

The license management part 12 individually sets a license in each tenant. The license management part 12 defines a role for allowing a user belonging to each tenant to use the license in the tenant. The information storage part 16 stores information on the license as license information 163 and also stores information on the role as role information 165. Examples of the license to be managed by the license management part 12 include a license for using the service provided by the resource providing server 20 (web service or cloud service), a license for using the software package provided by the resource providing server 20, and a license for using the function of the information apparatus 40.

(Role Setting Part 13)

The role setting part 13 (example of an identifier and a receiver) sets a role within a range of the license managed by the license management part 12. If the role needs to be set beyond the range of the license set in the tenant, it is necessary to change the license setting made by the license management part 12. Examples of the case in which the role needs to be set beyond the range of the license set in the tenant include a case in which the number of necessary licenses has become larger than the number of set licenses due to an increase in the number of member users or a case in which a license having different contents from the contents of the set licenses is necessary.

As described above, the role of this exemplary embodiment is set for a user for each element of the service function. Thus, the role setting part 13 of this exemplary embodiment sets the role for the user in the tenant based on the element of the service function.

When a role is assigned to or unassigned from one user belonging to one tenant, the role setting part 13 of this exemplary embodiment identifies role information of the one user in a different tenant. The role setting part 13 identifies the role information of the one user in the different tenant by referring to the membership information 161, license possession information 164, and role assignment information 167 in a tenant user management table 604 (see FIG. 6B) and the license information 163 and the role information 165 in a role management table 602 (see FIG. 5B).

The role setting part 13 avoids redundant assignment of a license to one user belonging to a plurality of tenants. In the description of this exemplary embodiment, the assignment and the unassignment may be referred to collectively as "setting".

For example, in this exemplary embodiment, a user belonging to one tenant may newly belong to a different tenant and a role may newly be set for the member user in the different tenant. In the description of this exemplary embodiment, the new role assignment to the member user is referred to as "role assignment processing".

In the role assignment processing, the role setting part 13 identifies a role already set for a member user in one tenant to which the member user belongs. Based on role information of the user belonging to the one tenant, the role setting part 13 of this exemplary embodiment sets a role for the same member user in the different tenant and the role for the same member user in the one tenant.

In particular, the role setting part 13 of this exemplary embodiment makes determination on role assignment for a function element based on a function of a role assigned to a member user. That is, the role setting part 13 identifies an inclusion relationship by comparing a function of a role to be newly assigned to the member user in a different tenant with a function of a role already assigned to the same member user in one tenant. Based on the inclusion relationship of the functions, the role setting part 13 operates such that the role regarding the function including the other function is assigned to the member user and the role regarding the function included in the other function is not assigned to the same member user.

For example, a role set in one tenant may be unassigned from a user belonging to the one tenant and a different tenant. In the description of this exemplary embodiment, this case is referred to as "role unassignment processing".

In the role unassignment processing, the role setting part 13 identifies a role set for a member user in a different tenant. Based on role information of the member user in one tenant and role information of the member user in the different tenant, the role setting part 13 of this exemplary embodiment sets the role for the member user in the different tenant.

As described above, the role setting part 13 of this exemplary embodiment makes determination on role assignment for a function element based on a function of a role assigned to a member user. Also in the role unassignment processing, the role setting part 13 identifies a function of a role to be unassigned from the member user in one tenant based on a function element and assigns the role for the identified function element to the same member user in a different tenant.

(Role Management Part 14)

For example, the role management part 14 manages, as information related to roles, information on new role setting (assignment of a role to a member user), information on unassignment of a role, information for identifying a tenant in which a role is used (tenant ID), information for identifying a member user who uses a role (user ID), information on an operation performed when a role is used, and information on a date and time when a role is used.

As described above, the tenant management server 10 uses the function of the license management part 12 to control access to a resource on the network from a user belonging to a tenant based on authority set in the tenant to use the resource. Further, the tenant management server 10 uses the functions of the user registration part 11, the license management part 12, the role setting part 13, and the role management part 14 to register and manage a user who has access a resource on the network 50.

(Notification Part 15)

When a role is assigned to or unassigned from a user in a tenant, the notification part 15 (example of a notifier) gives a notification related to the role setting to the user whose role has been set. Specifically, the notification part 15 acquires information related to the role setting from the role setting part 13. Then, the notification part 15 notifies the user based on the information related to the role setting.

When a role is assigned to or unassigned from a user in a different tenant along with an operation of a tenant administrator of one tenant, the notification part 15 gives a notification related to the role setting to a tenant administrator of the different tenant. Specifically, the notification part 15 acquires information related to the role setting from the role setting part 13. Then, the notification part 15 notifies the tenant administrator based on the information related to the role setting.

When a role is assigned to a user in one tenant and when the role is redundantly set for the same user in a different tenant, the notification part 15 of this exemplary embodiment notifies a tenant administrator that the role is assigned in the different tenant.

In this exemplary embodiment, the notification part 15 notifies a tenant administrator by mail or by displaying notification details on a screen of the client terminal 30 that is used by the tenant administrator.

(Information Storage Part 16)

The information storage part 16 stores the membership information 161, tenant information 162, the license information 163, the license possession information 164, the role information 165, the user information 166, and the role assignment information 167.

The membership information 161 is information that associates a user ID and a tenant ID of a tenant to which a user identified by the user ID belongs.

The tenant information 162 is information that associates a tenant ID and attribute information of a tenant identified by the tenant ID (tenant attribute).

The license information 163 is information that associates a license ID and attribute information of a license identified by the license ID (license attribute).

The license possession information 164 is information that associates a tenant ID and a license ID of a license possessed by (set in) a tenant identified by the tenant ID.

The role information 165 is information that associates a license ID and a role ID of a role defined for a license identified by the license ID.

The user information 166 is information that associates a user ID and attribute information of a user identified by the user ID (user attribute).

The role assignment information 167 is information that associates a user ID and a role ID of a role assigned to a user identified by the user ID.

The user ID is identification information for identifying a user.

The user attribute is information indicating an attribute of a user related to a tenant and may include information on a user in an organization for which a tenant is set. Details of the attribute are defined depending on, for example, a tenant, specifications and operating conditions of the tenant management server 10, and a service.

The tenant ID is identification information for identifying a tenant.

The tenant attribute is information indicating an attribute of a tenant and may include information on an organization for which a tenant is set. Details of the attribute are defined depending on, for example, specifications and operating conditions of the tenant management server 10 and a service.

The license ID is identification information for identifying a license.

The license attribute is information indicating an attribute of a license set in a tenant and may include the number of licenses and details of authority and limitation based on the license. Details of the attribute are defined depending on, for example, the type and contents of a resource or service available with the license.

The role ID is identification information for identifying a role.

Information on the type of an operation for a role is information indicating which of setting, deletion, and use of a role is performed. The information also includes information on a date and time when the operation is performed.

Next, the information stored in the information storage part 16 is described in detail.

FIGS. 5A and 5B illustrate examples of a user information management table 601 and the role management table 602.

Figure 6A:
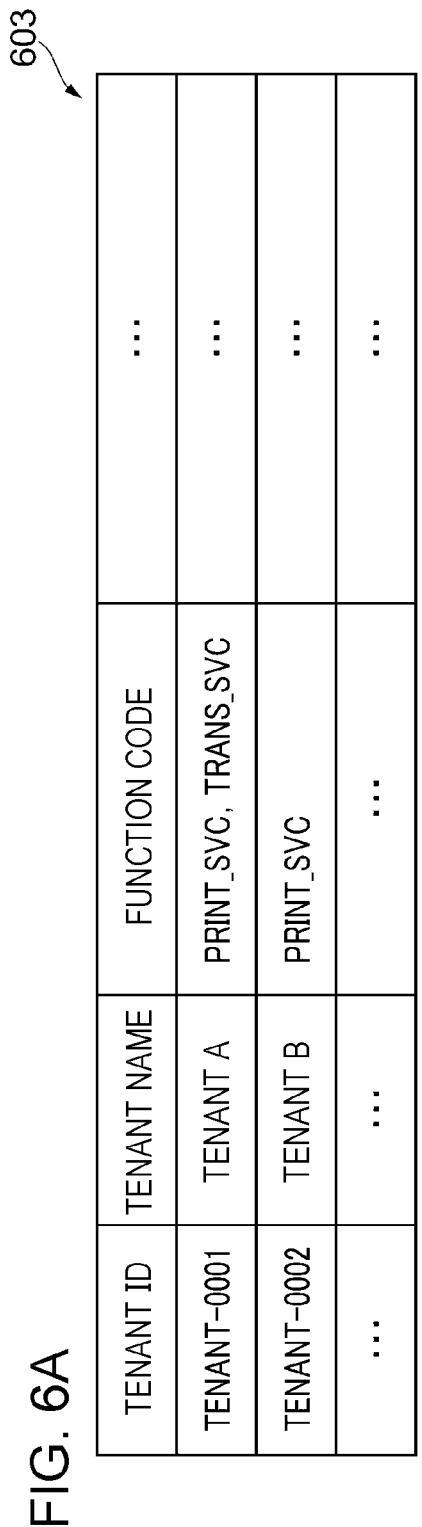
FIGS. 6A and 6B illustrate examples of a tenant management table and a tenant user management table.
Figure 6B:
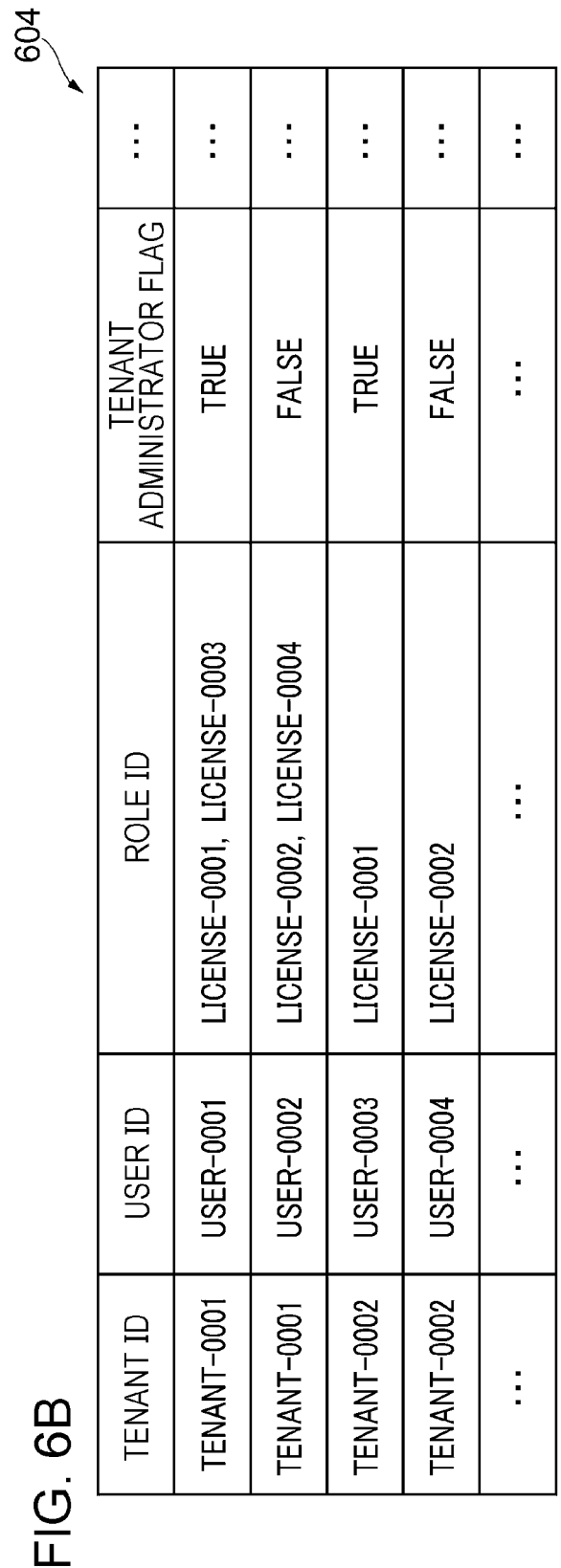

FIGS. 6A and 6B illustrate examples of a tenant management table 603 and the tenant user management table 604.

As illustrated in FIG. 5A, the information storage part 16 of this exemplary embodiment manages the user information 166 in the user information management table 601. In the user information management table 601, pieces of information on a user ID, a specific user name, and a mail address are linked together.

As illustrated in FIG. 5B, the information storage part 16 of this exemplary embodiment manages the license information 163 and the role information 165 in the role management table 602. In the role management table 602, a role ID, a role name that is a specific name of a role, a function code representing a function associated with the role, and a function element code representing an available function element are linked together.

As illustrated in FIG. 6A, the information storage part 16 of this exemplary embodiment manages the tenant information 162 in the tenant management table 603. In the tenant management table 603, a tenant ID, a tenant name that is a specific name of a tenant, and a function code that is a code of a function available in the tenant are linked together.

As illustrated in FIG. 6B, the information storage part 16 of this exemplary embodiment manages the membership information 161, the license possession information 164, and the role assignment information 167 in the tenant user management table 604. In the tenant user management table 604, a tenant ID, a user ID, a role ID of a role assigned to a user, and a tenant administrator flag for identifying a tenant administrator are linked together.

(Operation Screen Generation Part 17)

As illustrated in FIG. 4, the operation screen generation part 17 (example of a display) generates an operation screen as, for example, a web page. The operation screen may be categorized into an administrator's operation screen to be used by a tenant administrator and a user's operation screen to be used by a member user.

On the administrator's operation screen, for example, operations for the user registration part 11, the license management part 12, the role setting part 13, and the role management part 14 are received. The administrator's operation screen is generated when a tenant administrator has logged into a tenant managed by the tenant administrator by using administrator's authority and is sent to the client terminal 30 of the tenant administrator.

The user's operation screen is generated when a user belonging to a tenant has logged into the tenant as a member user and is sent to the client terminal 30 of the member user.

The operation screen sent to each client terminal 30 is displayed on the display of the client terminal 30. When the tenant administrator or the member user performs an input operation or the like on the operation screen displayed on the display of the client terminal 30, information on details of the operation is transmitted from the client terminal 30 to the tenant management server 10.

The login refers to an operation for authenticating a user belonging to a tenant by using preset account information in order to use a resource on the network 50 under the management of the tenant management server 10.

(Transmission/Reception Control Part 18)

For example, the transmission/reception control part 18 controls the network interface 206 illustrated in FIG. 3 to transmit or receive a command or data between the tenant management server 10 and each of the resource providing server 20, the client terminal 30, and the information apparatus 40 via the network 50.

<Functional Configuration of Resource Providing Server>

Figure 7:
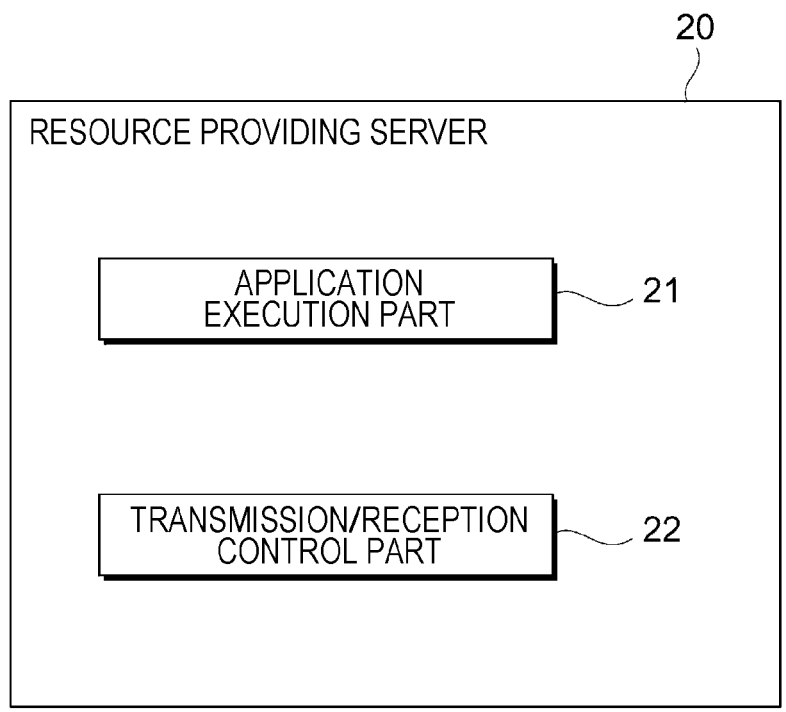
FIG. 7 illustrates the functional configuration of the resource providing server of the exemplary embodiment.

FIG. 7 illustrates the functional configuration of the resource providing server 20 of this exemplary embodiment.

As illustrated in FIG. 7, the resource providing server 20 includes an application execution part 21 and a transmission/reception control part 22. For example, the functions of the application execution part 21 and the transmission/reception control part 22 are implemented such that the CPU 201 executes the program in the computer 200 illustrated in FIG. 3.

The application execution part 21 is an executor that executes an application program that implements processing related to provision of a resource by the resource providing server 20. For example, if the resource providing server 20 is a service provider, the application execution part 21 executes processing related to a service (web service or cloud service). If the resource providing server 20 is a server that provides a software package, the application execution part 21 implements a function as a license management system (LMS) server that manages a license for using the software package. The LMS server refers to a server that checks the validity of a license of a software package and gives permission for use.

The transmission/reception control part 22 is a communicator for communication with the tenant management server 10, the client terminal 30, and the information apparatus 40. For example, the transmission/reception control part 22 controls the network interface 206 illustrated in FIG. 3 to transmit or receive a command or data between the resource providing server 20 and each of the tenant management server 10, the client terminal 30, and the information apparatus 40 via the network 50.

In this exemplary embodiment, a user who uses a resource to be provided by the resource providing server 20 is authenticated by the authentication server (such as the IdP) (not illustrated). Thus, the resource providing server 20 does not have means for user authentication as illustrated in FIG. 7. The resource providing server 20 may be provided with an authenticator to authenticate the user without using the authentication server.

<Functional Configuration of Client Terminal>

Figure 8:
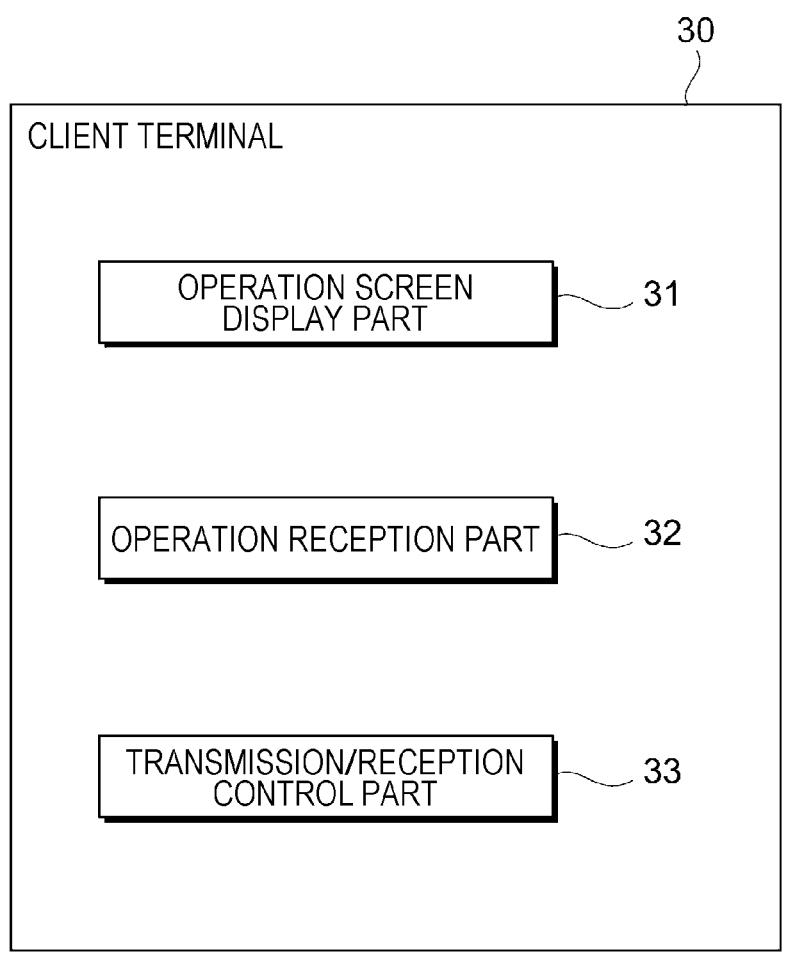
FIG. 8 illustrates the functional configuration of the client terminal of the exemplary embodiment.

FIG. 8 illustrates the functional configuration of the client terminal 30 of this exemplary embodiment.

As illustrated in FIG. 8, the client terminal 30 includes an operation screen display part 31, an operation reception part 32, and a transmission/reception control part 33. For example, the functions of the operation screen display part 31, the operation reception part 32, and the transmission/reception control part 33 are implemented such that the CPU 201 executes the program in the computer 200 illustrated in FIG. 3.

The operation screen display part 31 generates and displays an operation screen for using the service or the software package provided by the resource providing server 20, the function of the information apparatus 40, or the like. For example, the operation screen display part 31 controls the display mechanism 204 illustrated in FIG. 3 to display the operation screen on the display device 210. The operation reception part 32 receives an operation performed on the operation screen as an operation for using the service, the software package, the function of the information apparatus 40, or the like. For example, the operation reception part 32 receives an operation performed by using the input device 205 illustrated in FIG. 3. For example, if the service, the software package, the function of the information apparatus 40, or the like is provided by using the World Wide Web (WWW), the functions of the operation screen display part 31 and the operation reception part 32 are implemented by a web browser.

The transmission/reception control part 33 is a communicator for communication with the tenant management server 10 and the resource providing server 20. For example, the transmission/reception control part 33 controls the network interface 206 illustrated in FIG. 3 to transmit or receive a command or data between the client terminal 30 and each of the tenant management server 10 and the resource providing server 20 via the network 50.

Next, description is made of processing to be performed when the role assignment processing for a user is performed in the information processing system 1 of this exemplary embodiment.

Figure 9:
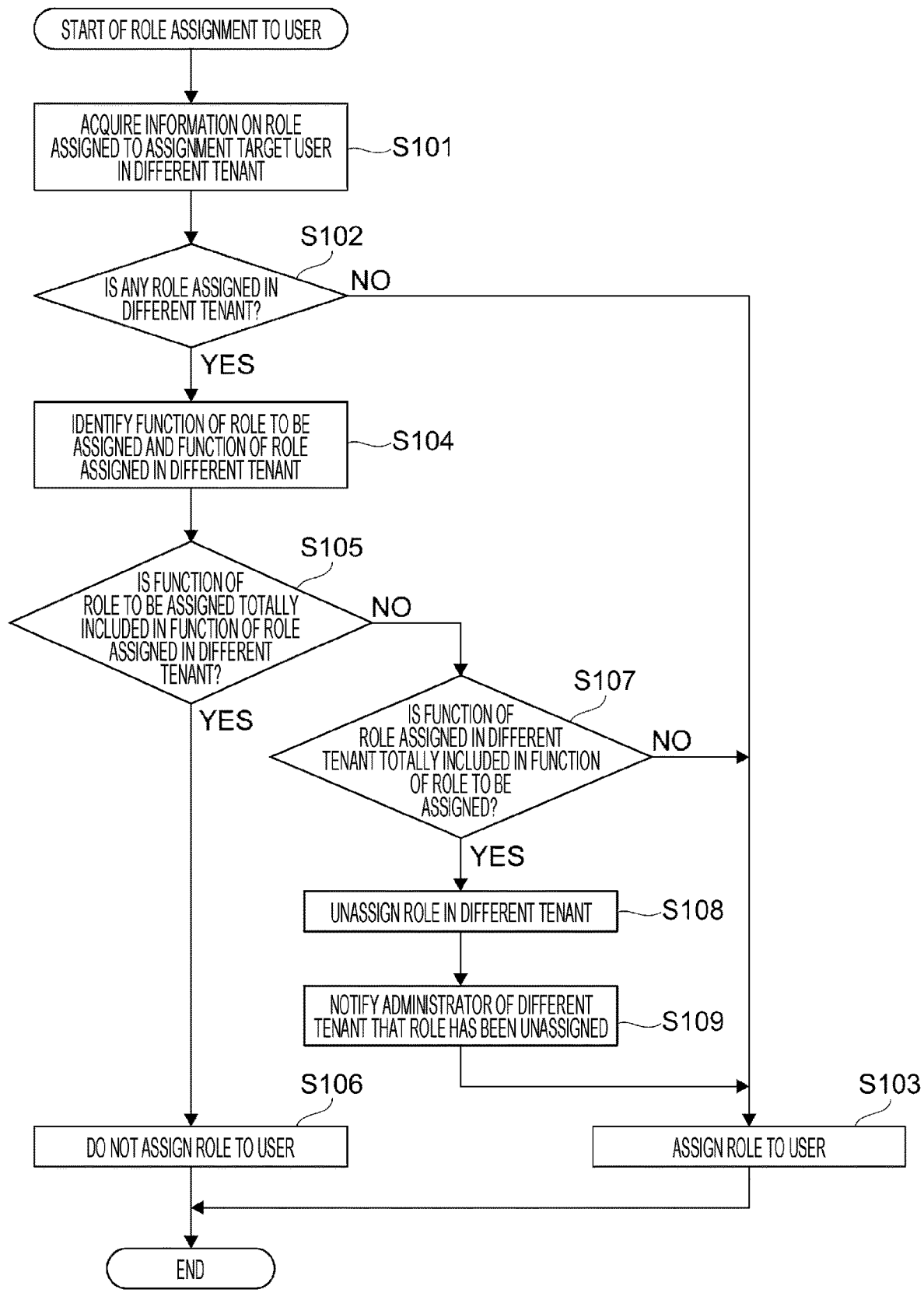
FIG. 9 is a flowchart illustrating an operation related to role setting in a case in which role assignment processing for a user is performed.

FIG. 9 is a flowchart illustrating an operation related to role setting in the case in which the role assignment processing for a user is performed.

In the example illustrated in FIG. 9, a user belonging to one tenant is caused to newly belong to a different tenant. Then, a role is assigned to the user in the new different tenant. The following processing is executed by the respective components of the tenant management server 10.

In the tenant management server 10, information on a role already assigned to a role assignment target user in a different tenant is acquired (Step 101). Then, it is determined whether any role is assigned to the role assignment target user in the different tenant (Step 102). When no role is assigned to the role assignment target user in the different tenant ("NO" in Step 102), an assignment target role is assigned to the user (Step 103) and the processing is terminated.

When a role is assigned to the role assignment target user in the different tenant ("YES" in Step 102), a function of the role to be assigned and a function of the role assigned to the assignment target user in the different tenant are identified (Step 104). Then, it is determined whether the function of the role to be assigned is totally included in the function of the role assigned in the different tenant (Step 105). When the function of the role to be assigned is totally included in the function of the role assigned in the different tenant ("YES" in Step 105), the role is not assigned to the assignment target user (Step 106).

When the function of the role to be assigned is not totally included in the function of the role assigned in the different tenant ("NO" in Step 105), it is determined whether the function of the role assigned in the different tenant is totally included in the function of the role to be assigned (Step 107). When the function of the role assigned in the different tenant is not totally included in the function of the role to be assigned ("NO" in Step 107), the processing proceeds to Step 103 and the role is assigned to the user. Then, the processing is terminated.

When the function of the role assigned in the different tenant is totally included in the function of the role to be assigned ("YES" in Step 107), the role in the different tenant is unassigned (Step 108). The administrator of the different tenant is notified that the role in the different tenant has been unassigned (Step 109). Then, the processing proceeds to Step 103 and the role is assigned to the user. Then, the processing is terminated.

Next, detailed description is made of a case in which the role is not assigned to the user in Step 106 in the role setting in which the role assignment processing for the user is performed as described above.

FIGS. 10A to 11B illustrate the case in which the role assignment processing is performed and the role is not assigned to the user.

Figure 10A:
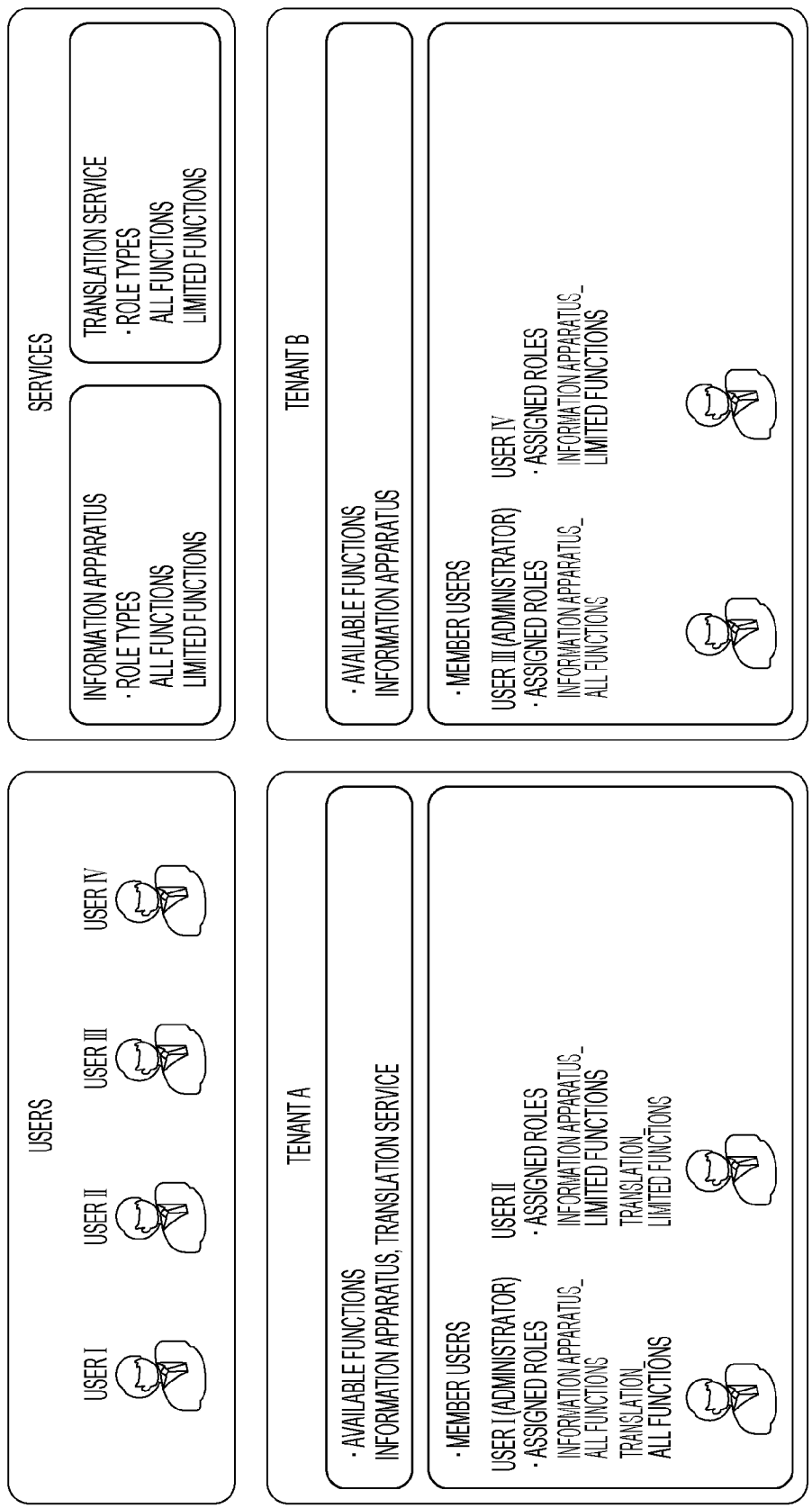
FIGS. 10A and 10B illustrate a case in which the role assignment processing is performed and a role is not assigned to a user.

As illustrated in FIG. 10A, the information apparatus and the translation service are set in a tenant A as available functions. A user I who is an administrator and a user II belong to the tenant A. In the tenant A, the user I is assigned roles of all the functions of the information apparatus and all the functions of the translation service. In the tenant A, the user II is assigned roles of limited functions of the information apparatus and limited functions of the translation service.

In a tenant B, the information apparatus is set as an available function. A user III who is an administrator and a user IV belong to the tenant B. In the tenant B, the user III is assigned a role of all the functions of the information apparatus. In the tenant B, the user IV is assigned a role of limited functions of the information apparatus.

Figure 10B:
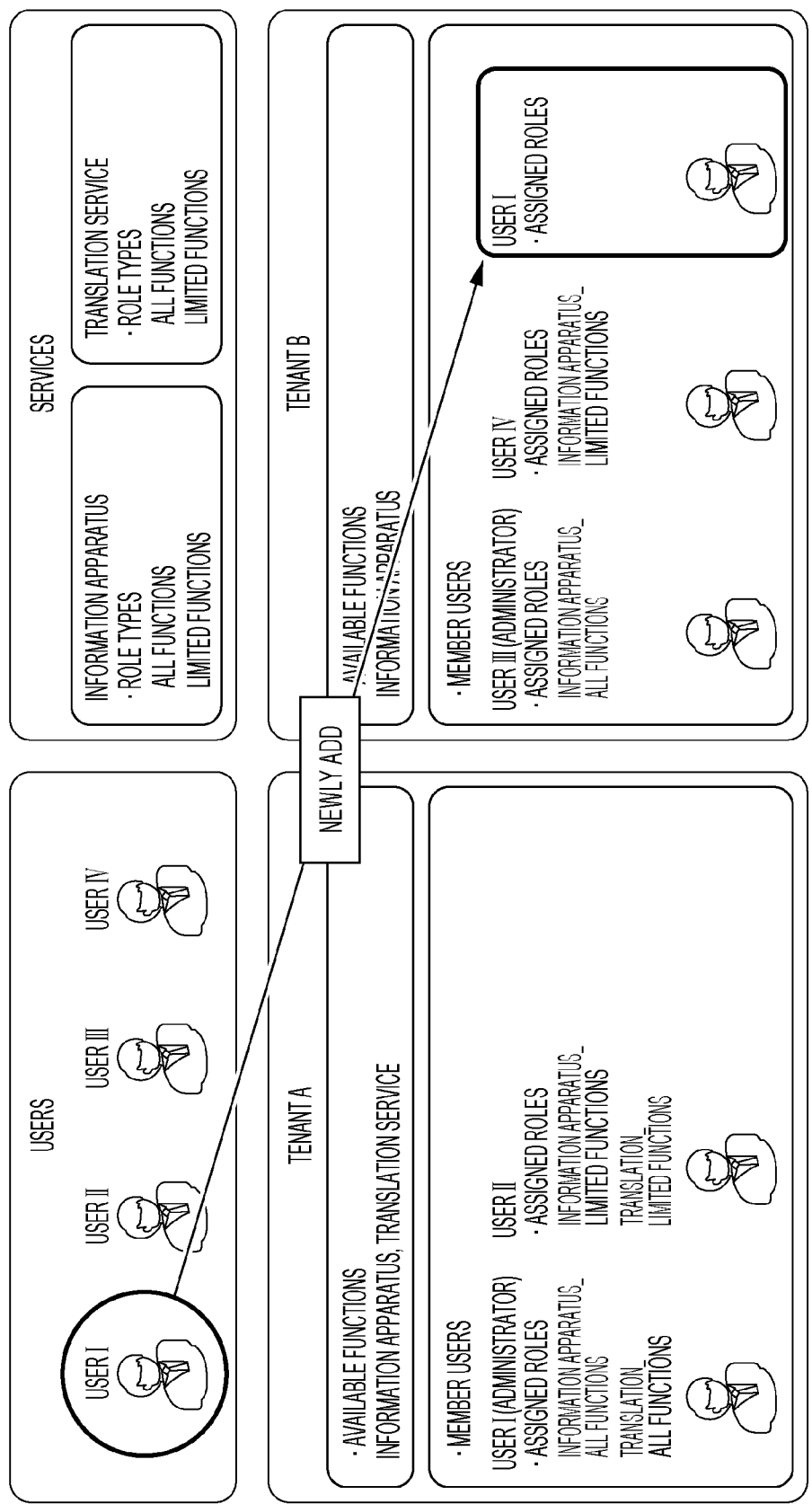
Figure 11A:
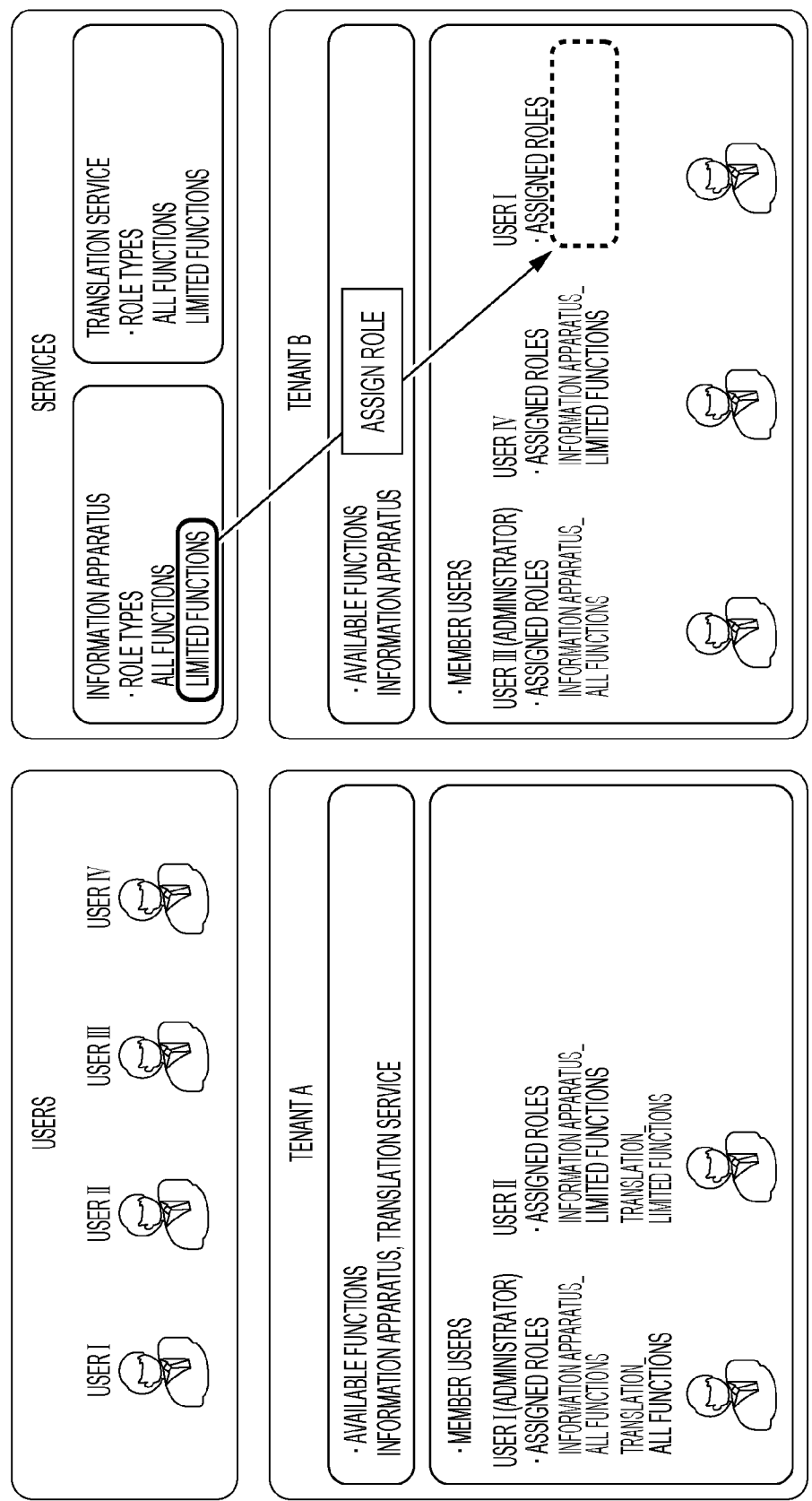
FIGS. 11A and 11B illustrate the case in which the role assignment processing is performed and the role is not assigned to the user.

As illustrated in FIG. 10B, the user I belonging to the tenant A is newly added to the tenant B. As illustrated in FIG. 11A, an attempt is made to assign a role of limited functions of the information apparatus to the user I in the tenant B. This operation is performed by the user III who is the administrator of the tenant B.

Figure 11B:
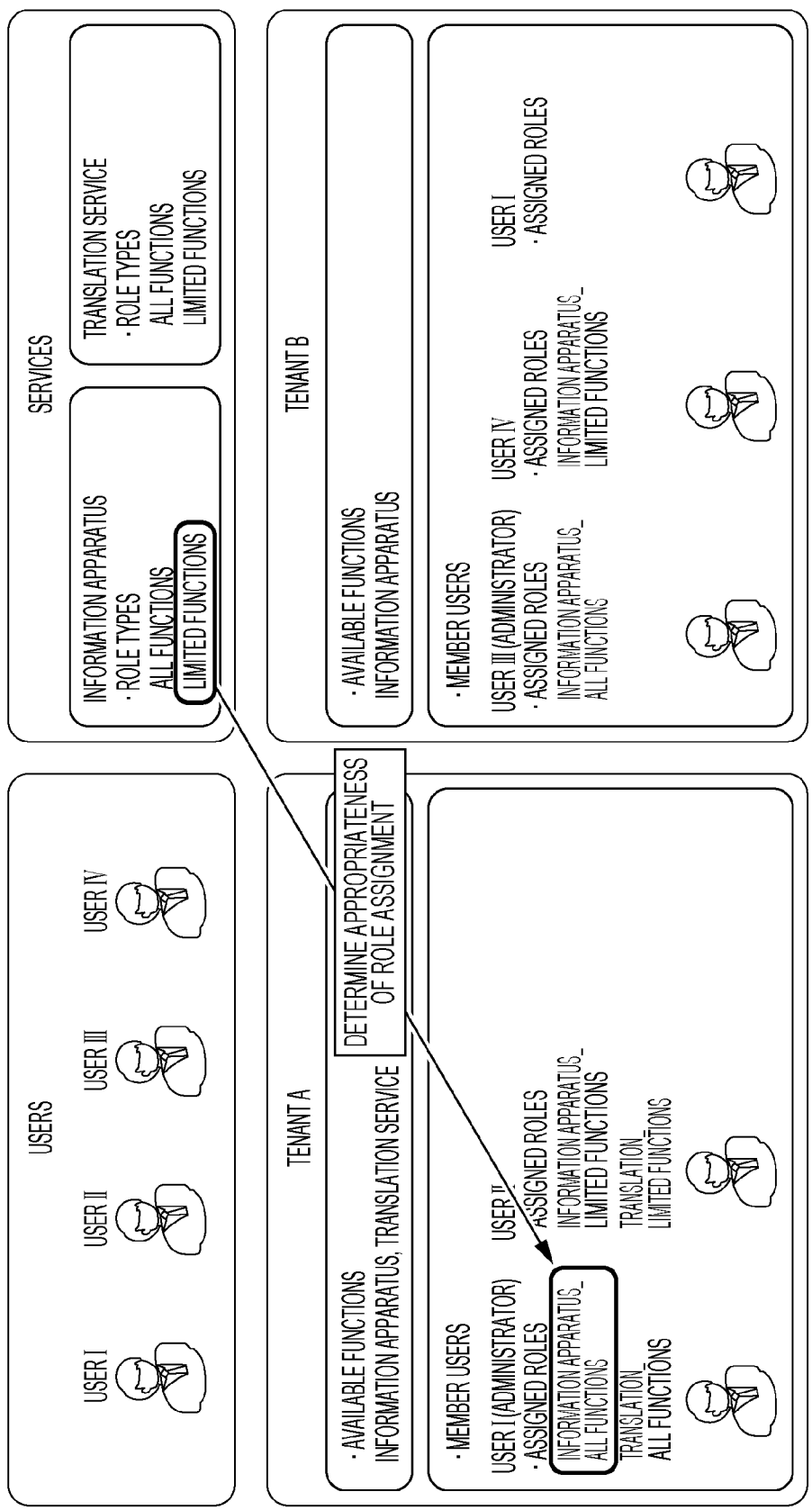

As illustrated in FIG. 11B, a role related to the information apparatus that is assigned to the user I in the tenant A is identified. In this example, the role to be assigned to the user I in the tenant B is the role of the limited functions of the information apparatus and the role assigned to the user I in the tenant A is the role of all the functions of the information apparatus. That is, the function of the role to be assigned to the user I in the tenant B is included in the function of the role assigned to the user I in the tenant A. In this example, the role is not assigned to the user I in the tenant B as illustrated in FIG. 11B.

Next, detailed description is made of a case in which the role in the different tenant is unassigned in Step 108 in the role setting in which the role assignment processing for the user is performed as described above.

FIGS. 12A to 13B illustrate the case in which the role assignment processing is performed and the role is unassigned from the user.

Figure 12A:
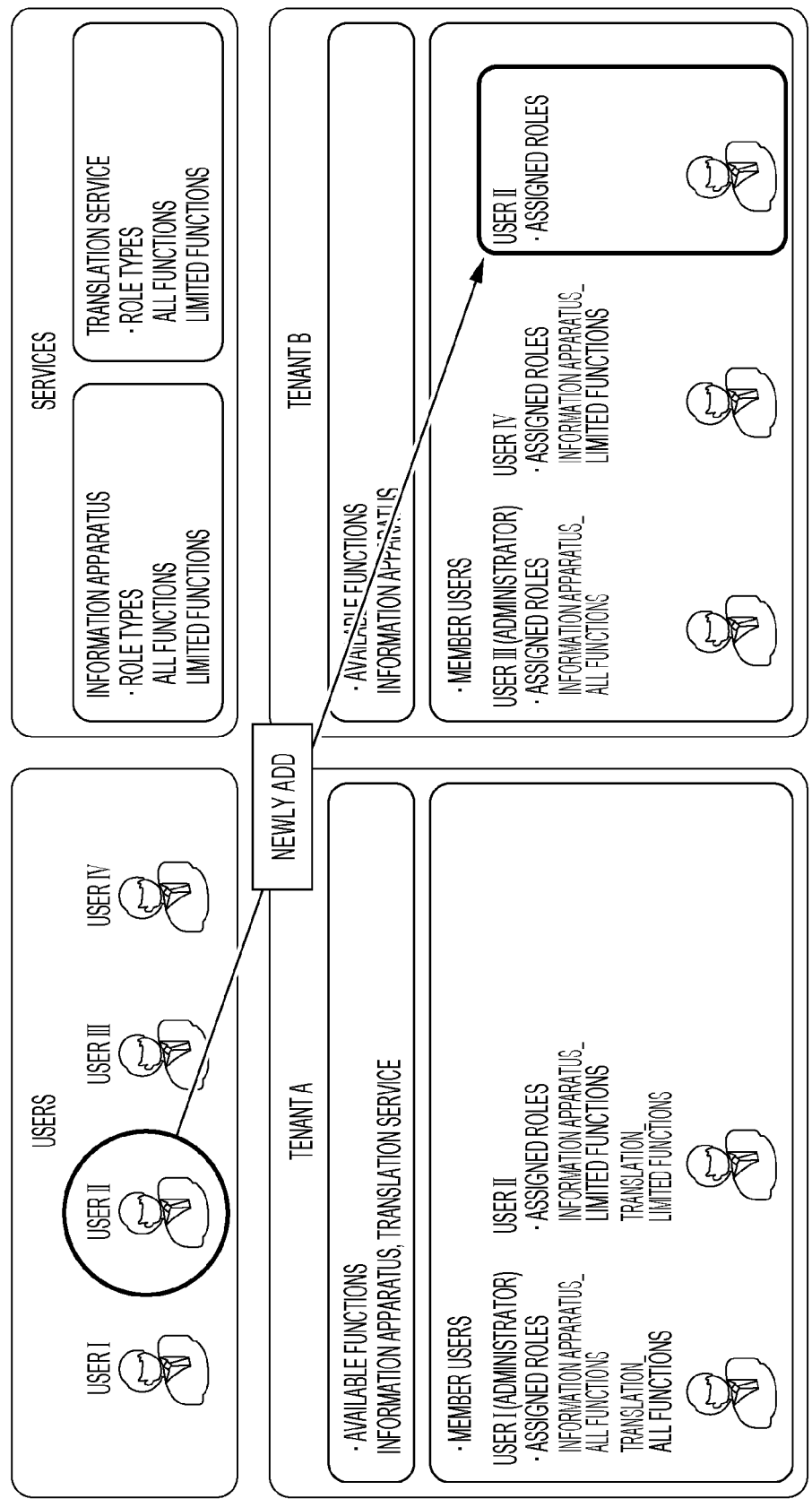
FIGS. 12A and 12B illustrate a case in which the role assignment processing is performed and a role is unassigned from a user.
Figure 12B:
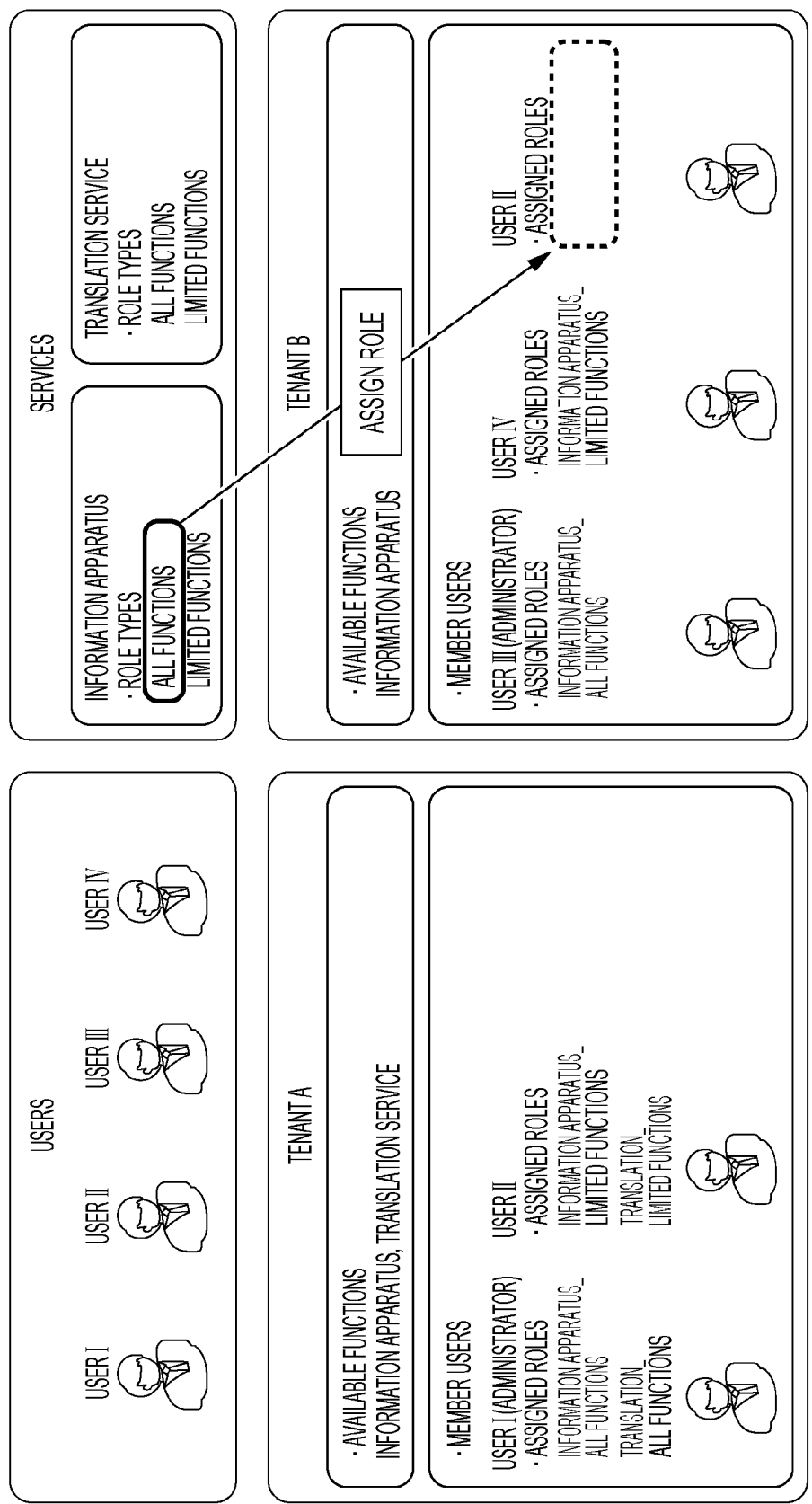

In FIGS. 12A and 12B, the configuration of each tenant and the role assignment to each user prior to the role assignment processing are similar to those in FIG. 10A.

As illustrated in FIG. 12A, the user II belonging to the tenant A is newly added to the tenant B. As illustrated in FIG. 12B, an attempt is made to assign a role of all the functions of the information apparatus to the user II in the tenant B. This operation is performed by the user III who is the administrator of the tenant B.

Figure 13A:
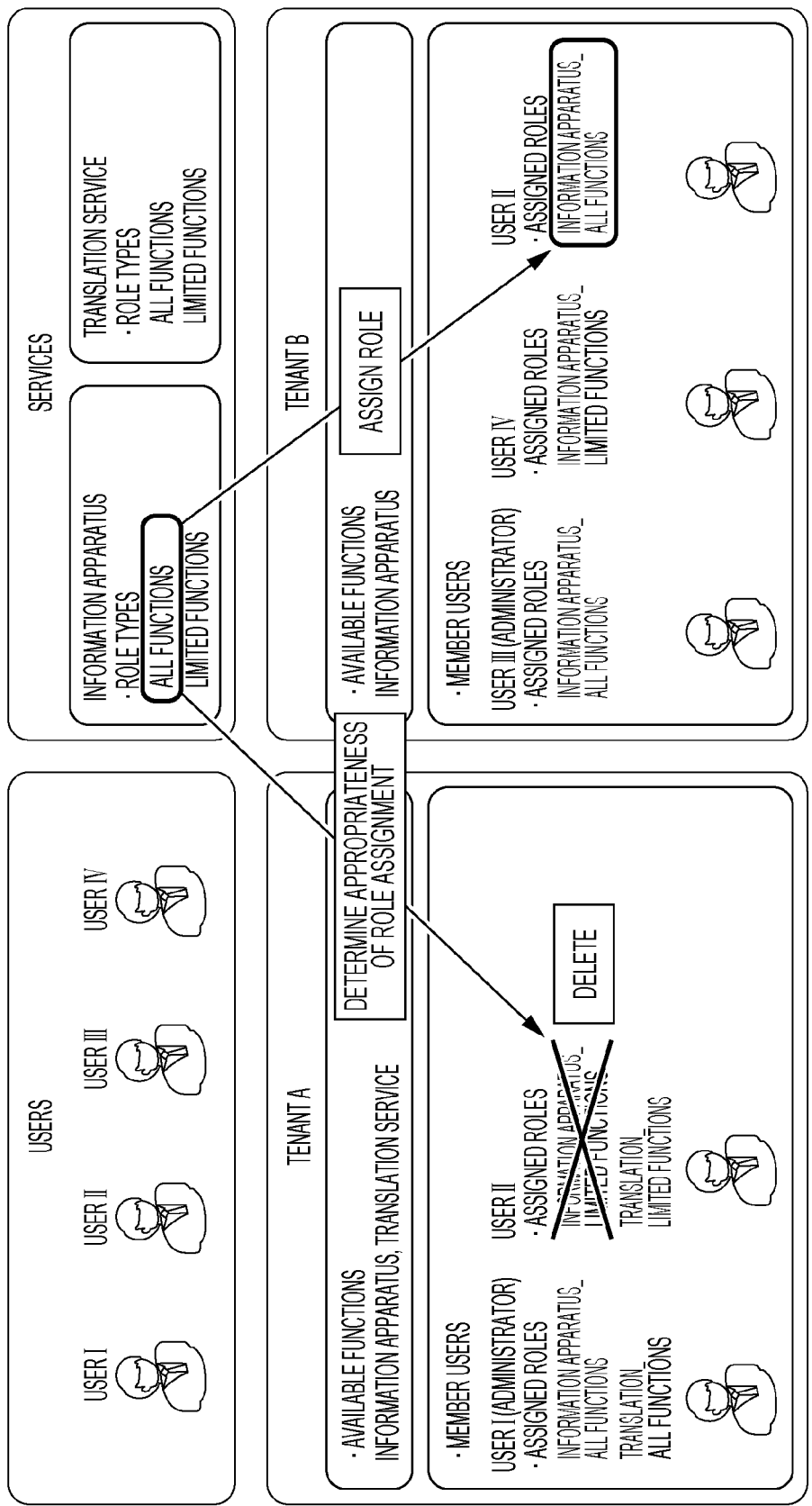
FIGS. 13A and 13B illustrate the case in which the role assignment processing is performed and the role is unassigned from the user.

As illustrated in FIG. 13A, a role related to the information apparatus that is assigned to the user II in the tenant A is identified. In this example, the role to be assigned to the user II in the tenant B is the role of all the functions of the information apparatus and the role assigned to the user II in the tenant A is the role of the limited functions of the information apparatus. That is, the function of the role to be assigned to the user II in the tenant B includes the function of the role assigned to the user II in the tenant A. In this example, the role of all the functions of the information apparatus is assigned to the user II in the tenant B while unassigning the role of the limited functions of the information apparatus that is assigned to the user II in the tenant A as illustrated in FIG. 13A.

Figure 13B:
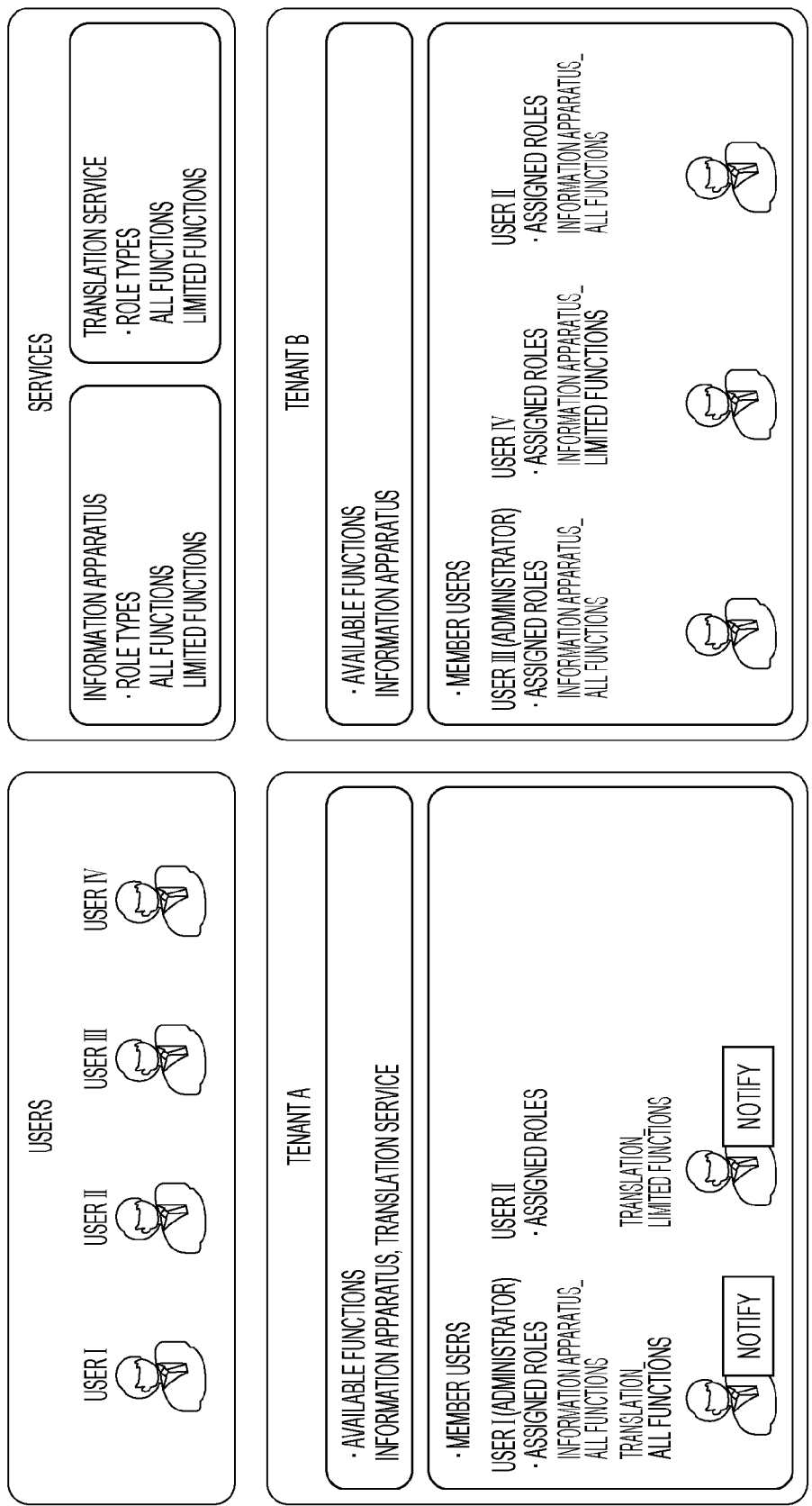

In this example, the user I who is the administrator of the tenant A is notified as illustrated in FIG. 13B that the role of the limited functions of the information apparatus has been unassigned from the user II. Further, the user II belonging to the tenant A is notified that the role of the limited functions of the information apparatus in the tenant A has been unassigned.

Next, description is made of processing to be performed when the role unassignment processing for a user is performed in the information processing system 1 of this exemplary embodiment.

Figure 14:
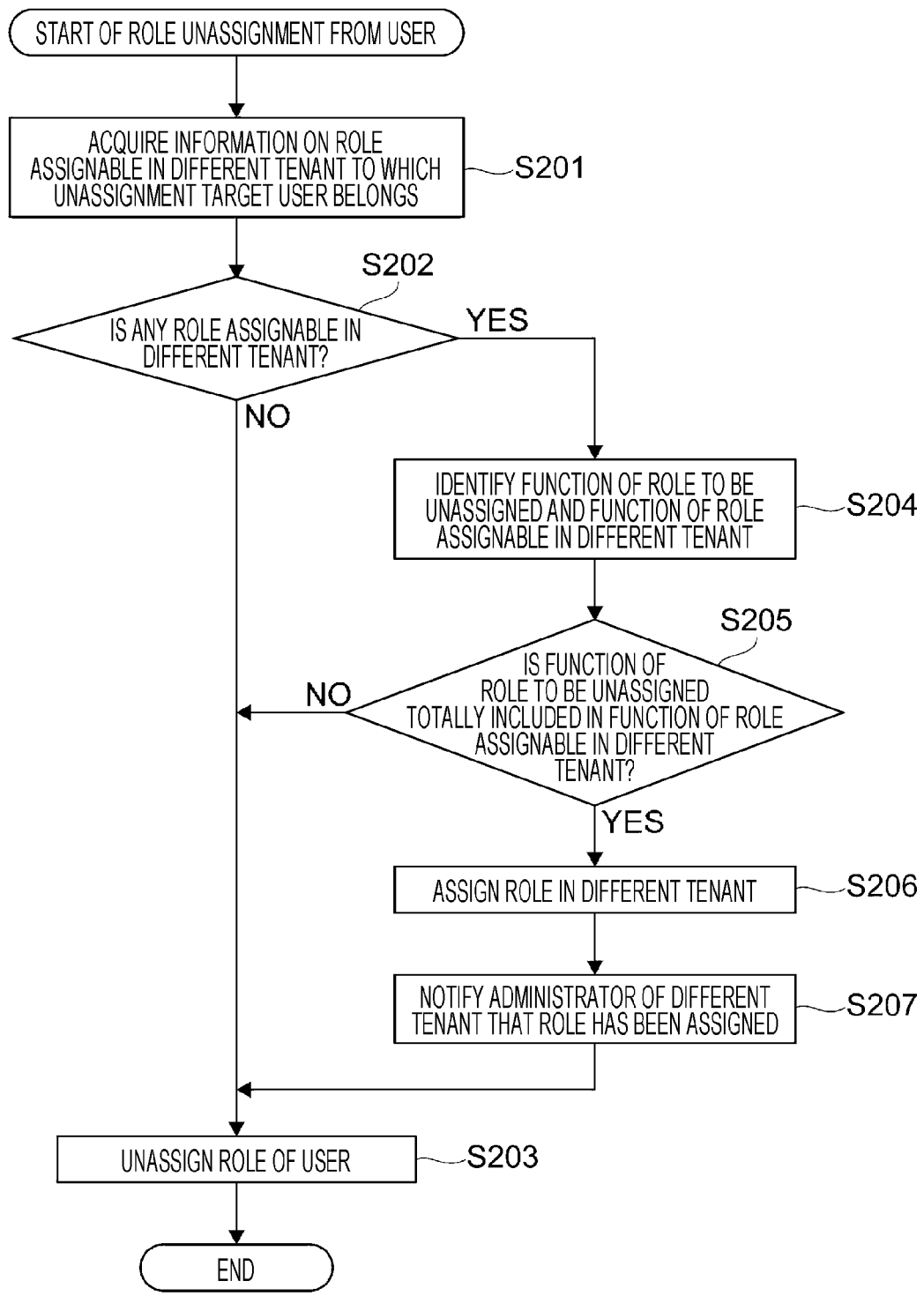
FIG. 14 is a flowchart illustrating an operation related to role setting in a case in which role unassignment processing for a user is performed.

FIG. 14 is a flowchart illustrating an operation related to role setting in the case in which the role unassignment processing for a user is performed.

In the example illustrated in FIG. 14, a role in one tenant is unassigned from a user belonging to both the one tenant and a different tenant. The following processing is executed by the respective components of the tenant management server 10.

In the tenant management server 10, information on a role assignable to a role unassignment target user in a different tenant is acquired (Step 201). Then, it is determined whether any role is assignable in the different tenant (Step 202). When no role is assignable in the different tenant ("NO" in Step 202), a role of the user is unassigned in one tenant (Step 203) and the processing is terminated.

When a role is assignable in the different tenant ("YES" in Step 202), a function of the role to be unassigned and a function of the role assignable in the different tenant are identified (Step 204). Then, it is determined whether the function of the role to be unassigned is totally included in the function of the role assignable in the different tenant (Step 205). When the function of the role to be unassigned is not totally included in the function of the role assignable in the different tenant ("NO" in Step 205), the role of the user is unassigned in the one tenant (Step 203) and the processing is terminated.

When the function of the role to be unassigned is totally included in the function of the role assignable in the different tenant ("YES" in Step 205), the role is assigned to the user in the different tenant (Step 206). The administrator of the different tenant is notified that the role has been assigned to the user in the different tenant (Step 207). Then, the role of the user is unassigned in the one tenant (Step 203) and the processing is terminated.

Next, detailed description is made of the role setting in which the role unassignment processing for the user is performed as described above.

Figure 15A:
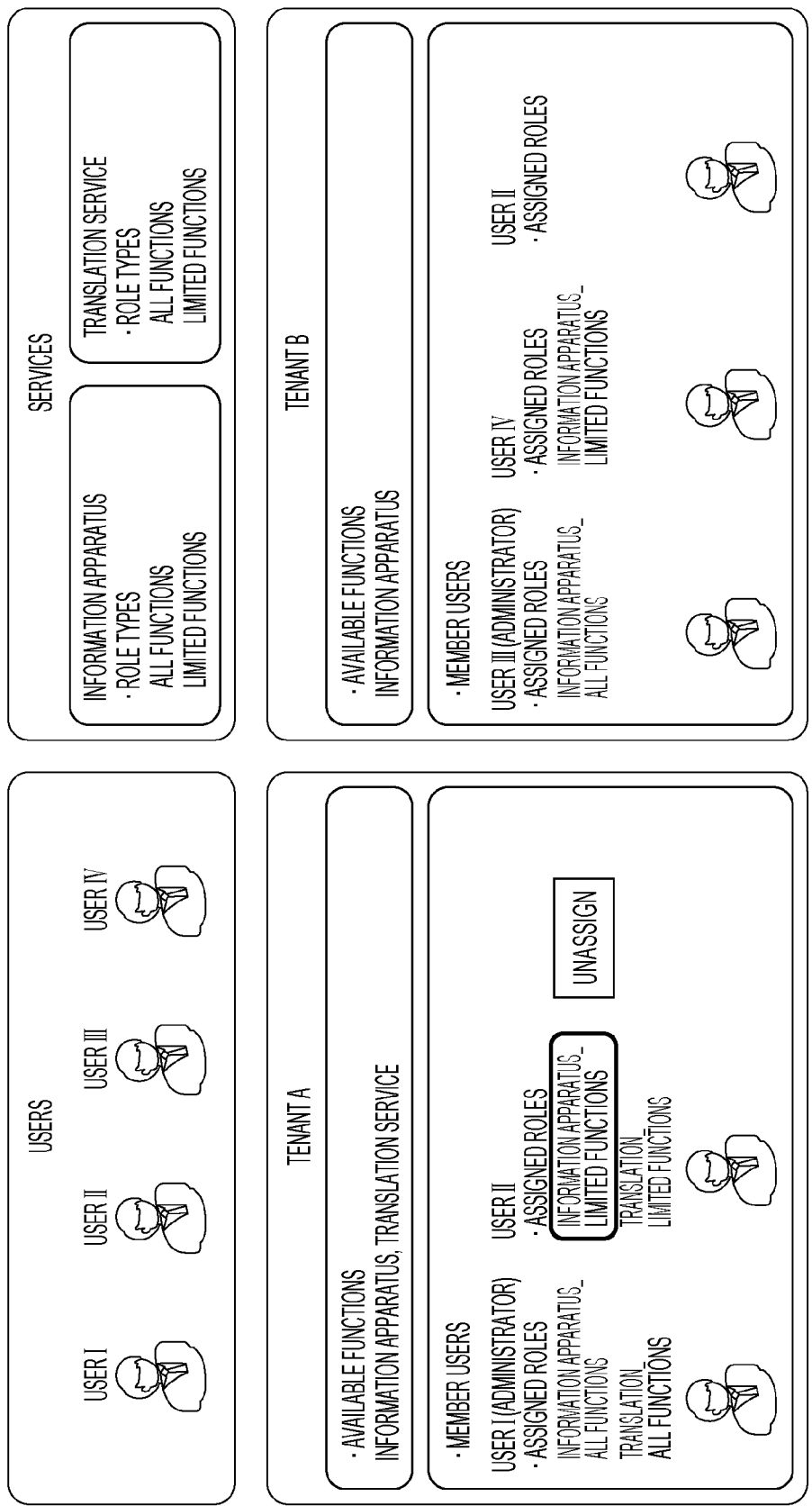
FIGS. 15A and 15B illustrate the case in which the role unassignment processing is performed.
Figure 15B:
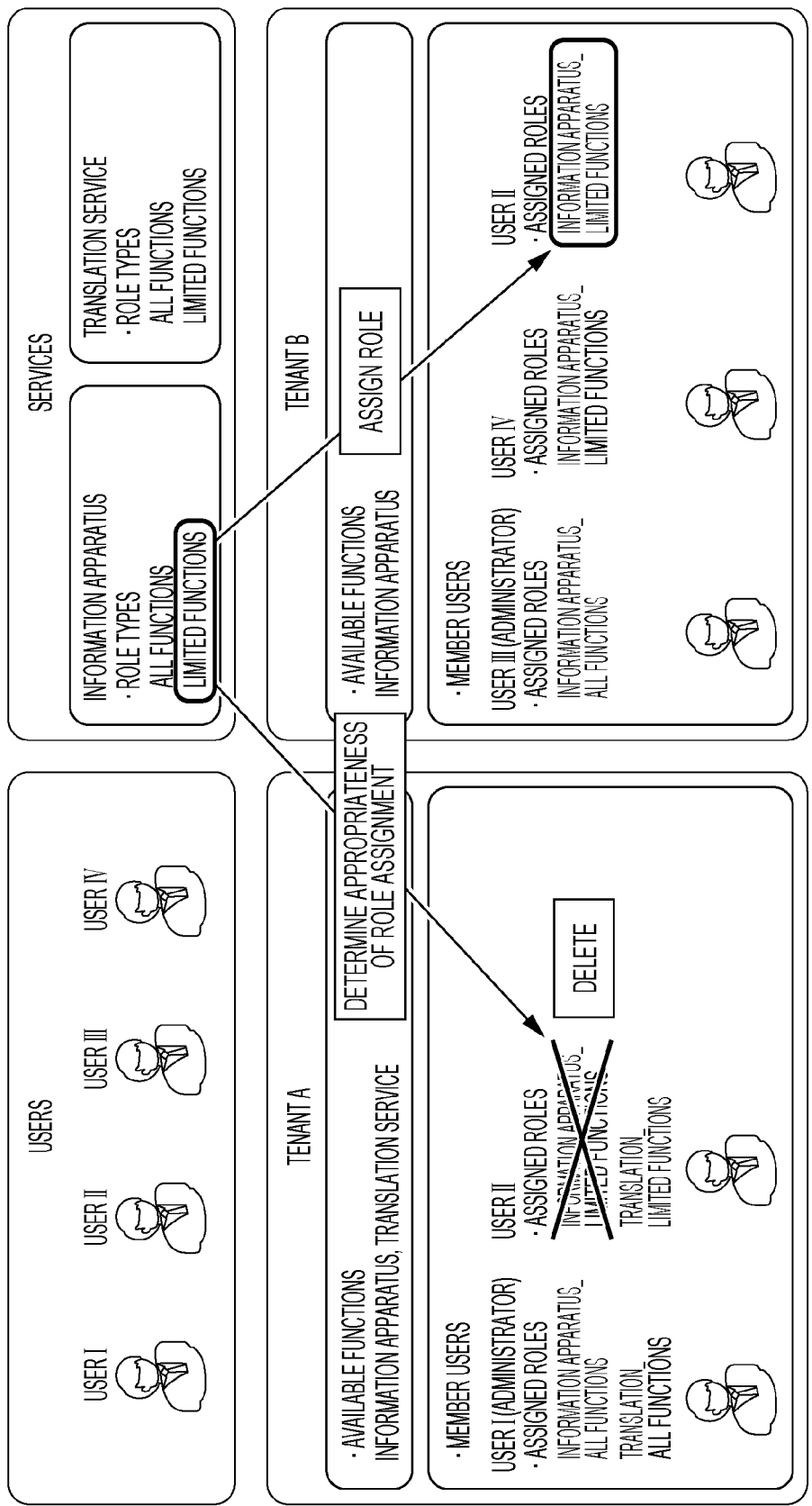
Figure 16:
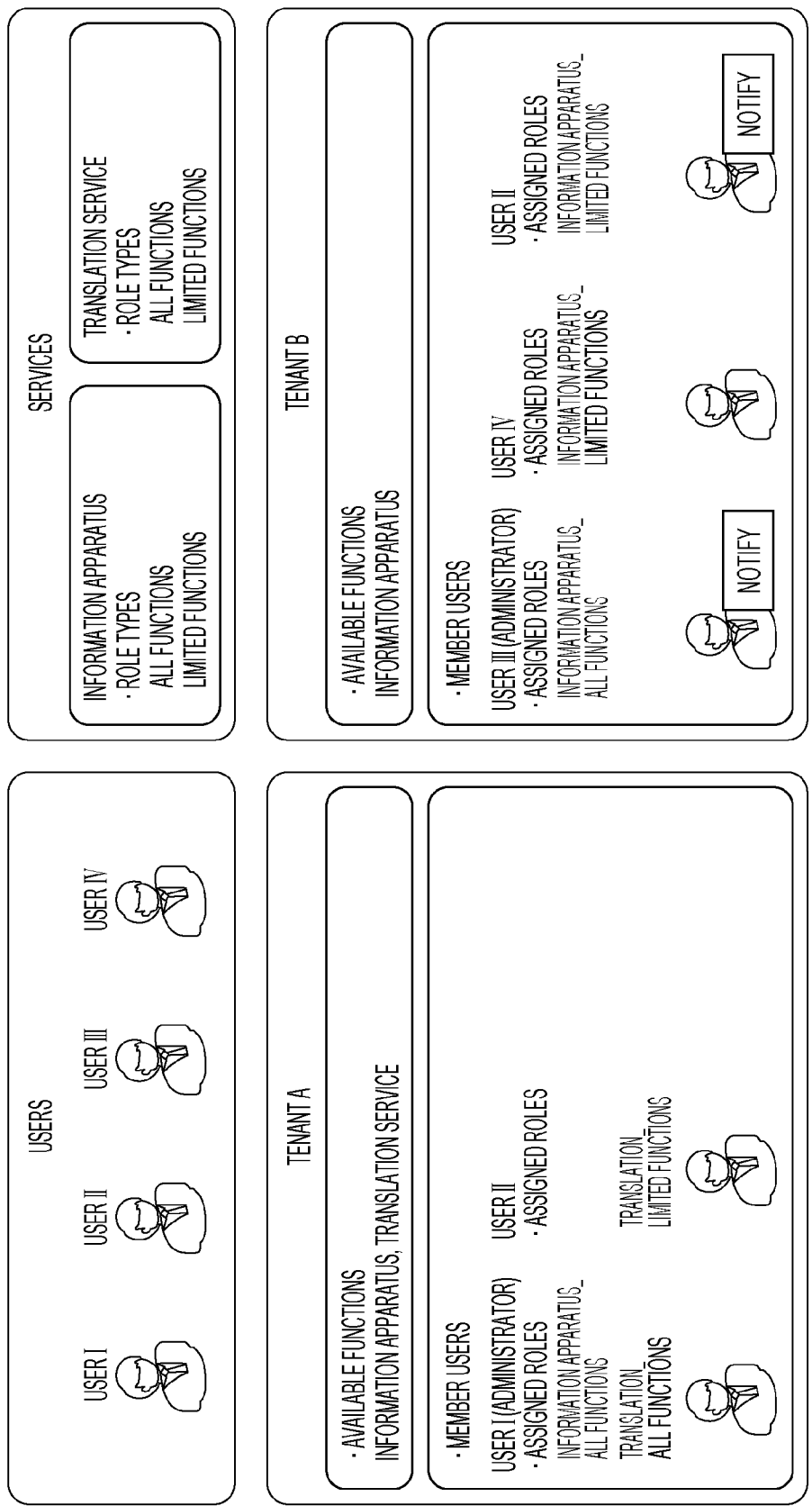
FIG. 16 illustrates the case in which the role unassignment processing is performed.

FIGS. 15A to 16 illustrate the case in which the role unassignment processing is performed.

In FIGS. 15A and 15B, the configuration of each tenant and the role assignment to each user prior to the role unassignment processing are similar to those in FIG. 10A.

As illustrated in FIG. 15A, an attempt is made to unassign a role of the function of the information apparatus in the tenant A from the user II belonging to the tenant A. This operation is performed by the user I who is the administrator of the tenant A.

As illustrated in FIG. 15B, a role related to the information apparatus that is assigned to the user II in the tenant A and a role related to the information apparatus that is assignable to the user II in the tenant B are identified. In this example, the role to be deleted in the tenant A is the role of the limited functions of the information apparatus and the role assignable to the user II in the tenant B is a role of all the functions or limited functions of the information apparatus. That is, the function of the role to be deleted in the tenant A is included in the function of the role assignable to the user II in the tenant B. In this example, the role of the limited functions of the information apparatus is assigned to the user II in the tenant B while unassigning the role of the limited functions of the information apparatus that is assigned to the user II in the tenant A as illustrated in FIG. 15B.

In this example, the user III who is the administrator of the tenant B is notified as illustrated in FIG. 16 that the role of the limited functions of the information apparatus has been assigned to the user II. Further, the user II belonging to the tenant B is notified that the role of the limited functions of the information apparatus has been assigned in the tenant B.

Next, a specific example of the administrator's operation screen is described.

FIG. 17 illustrates an example of the administrator's operation screen to be displayed on the display part of the client terminal 30 of this exemplary embodiment.

As illustrated in FIG. 17, the administrator's operation screen is displayed when a tenant administrator causes a user belonging to one tenant to newly belong to a different tenant and when a role is newly assigned to the user. In this example, the tenant administrator of the tenant B registers a user belonging to the tenant A in the tenant B.

A registration field 301 for registering a user in the tenant B and assigning a role to the user is displayed on the administrator's operation screen.

In this example, when a role is assigned to the user in the tenant B and when the role may redundantly be set for the same user in relation to the tenant A, a message 302 indicating that the role is assigned in the tenant A is displayed. In this example, the message 302 indicates, to the administrator of the tenant B, information on the role assigned to the user in the tenant A that is a different tenant.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system, comprising:
   a memory, storing a program; and
   a processor, executing the program to be configured to function as
      a first controller that controls access to resources on a network based on authority to use the resources;
      a first manager that registers and manages users who access the resources via the first controller;
      a second controller that controls, independently of the first controller, access to the resources on the network based on authority to use the resources;
      a second manager that registers and manages users who access the resources via the second controller; and
      an identifier that identifies, in response to second authority to use a resource in the second manager being set for a user, first authority of the user to use the resource in the first manager.

2. The information processing system according to claim 1, wherein, based on the identified first authority of the user in the first manager, the identifier performs processing related to setting of the first authority of the user in the first manager or the second authority of the user in the second manager.

3. The information processing system according to claim 2, wherein, when the identifier identifies a situation in which the first authority of the user has already been set in the first manager, the identifier avoids assigning the second authority of the user in the second manager.

4. The information processing system according to claim 3,
   wherein the resource comprises a plurality of function elements, and
   wherein, when authority already set in the first manager for the user to use a function of the resource includes authority to be set in the second manager for the user to use a function of the resource, the identifier avoids assigning the second authority of the user in the second manager.

5. The information processing system according to claim 2, wherein, when the identifier identifies a situation in which the second authority of the user has already been set in the second manager, the identifier unassigns the first authority of the user in the first manager.

6. The information processing system according to claim 5,
   wherein the resource comprises a plurality of function elements, and
   wherein, when authority to be set in the second manager for the user to use a function of the resource includes authority already set in the first manager for the user to use a function of the resource, the identifier unassigns the first authority of the user in the first manager.

7. The information processing system according to claim 2, wherein, when the second authority of the user is unassigned in the second manager and when the first authority of the user is not assigned in the first manager, the identifier assigns the first authority to the user in the first manager.

8. The information processing system according to claim 2, further comprising a notifier that gives, when the first authority of the user in the first manager or the second authority of the user in the second manager has been set, a notification related to the setting of the first authority or the second authority on an operation screen of an administrator who sets the first authority or the second authority of the user.

9. The information processing system according to claim 2, further comprising a notifier that gives, when the first authority has been set in the first manager, a notification related to the setting of the first authority to the user managed in the first manager or an administrator who manages the first manager.

10. An information processing apparatus, comprising:
a memory, storing a program; and
a processor, executing the program to be configured to function as
a first controller that controls access to resources on a network based on authority to use the resources;
a second controller that controls, independently of the first controller, access to the resources on the network based on authority to use the resources; and
a receiver that receives operations of setting authority of users to use resources on a network for which access is controlled by the processor based on the authority to use the resources; and
a display that displays, in response to second authority to use a resource for which access is controlled by the second controller being set for a user, a screen showing authority information related to first authority of the user to use the resource for which access is controlled by the first controller different from the second controller.

11. A non-transitory computer readable medium storing a program causing a computer to execute a process comprising:
receiving operations of setting authority of users to use resources on a network for which access is controlled by the computer based on the authority to use the resources, wherein the computer executing the process to function as a first controller that controls access to resources on a network based on authority to use the resources and a second controller that controls, independently of the first controller, access to the resources on the network based on authority to use the resources; and
identifying, in response to second authority to use a resource for which access is controlled by the second controller being set for a user, first authority of the user to use the resource for which access is controlled by the first controller different from the second controller.

* * * * *